(12) United States Patent
Kinamon et al.

(10) Patent No.: US 10,027,374 B1
(45) Date of Patent: Jul. 17, 2018

(54) SYSTEMS AND METHODS FOR WIRELESS COMMUNICATION USING A WIRE-BASED MEDIUM

(71) Applicants: Roy Kinamon, Tel Aviv (IL); Gal Zuckerman, Holon (IL)

(72) Inventors: Roy Kinamon, Tel Aviv (IL); Gal Zuckerman, Holon (IL)

(73) Assignee: Cellium Technologies, Ltd., Tel Aviv (IL)

(*) Notice: Subject to any disclaimer, the term of this patent is extended or adjusted under 35 U.S.C. 154(b) by 0 days.

(21) Appl. No.: 15/244,306

(22) Filed: Aug. 23, 2016

Related U.S. Application Data

(60) Provisional application No. 62/209,404, filed on Aug. 25, 2015.

(51) Int. Cl.

| | | |
|---|---|---|
| H03K 7/06 | (2006.01) | |
| H04L 27/04 | (2006.01) | |
| H04L 27/00 | (2006.01) | |
| H04B 3/60 | (2006.01) | |
| H04W 72/04 | (2009.01) | |
| H04W 72/08 | (2009.01) | |

(52) U.S. Cl.
CPC .......... *H04B 3/60* (2013.01); *H04W 72/0453* (2013.01); *H04W 72/082* (2013.01)

(58) Field of Classification Search
USPC .......... 375/219, 220, 221, 222, 240, 240.26, 375/240.27, 256, 259, 284, 285, 295, 299, 375/302, 316, 322, 324, 344, 345; 455/91, 101, 102, 110, 112, 113, 120
See application file for complete search history.

(56) References Cited

U.S. PATENT DOCUMENTS

| | | | | |
|---|---|---|---|---|
| 5,903,834 | A * | 5/1999 | Wallstedt | H04W 88/085 455/422.1 |
| 9,240,831 | B2 * | 1/2016 | Kakishima | H04B 7/0456 |
| 9,622,219 | B2 * | 4/2017 | Takano | H04W 72/04 |
| 9,674,810 | B2 * | 6/2017 | Juncker | H04W 56/0035 |
| 9,900,886 | B2 * | 2/2018 | Wild | H04W 72/044 |
| 2003/0185287 | A1 * | 10/2003 | Ogawa | H04B 3/36 375/211 |
| 2007/0173202 | A1 * | 7/2007 | Binder | H04B 7/15542 455/68 |

(Continued)

*Primary Examiner* — Linda Wong
(74) *Attorney, Agent, or Firm* — Intrinsic Law Corp.

(57) ABSTRACT

Systems and methods for: (i) using spatial multiplexing to mitigate wire-based interferences, (ii) using spatial multiplexing in conjunction with a wire-based medium, (iii) re-using a plurality of streams associated with spatial multiplexing and transported over a wire-based medium, (iv) preventing a first wireless transmission from interfering with a second wireless transmission both transported over a wire-based medium, (v) covering wirelessly multiple spatial locations via a wire-based medium using grouping of streams associated with spatial multiplexing, (vi) achieving spatial-division-multiple-access via a wire-based medium by grouping of streams in conjunction with a plurality of spatial locations, (vii) using wireless frame aggregation to mitigate wire-based interferences, and (viii) transporting a plurality of streams associated with spatial multiplexing over a wire-based medium together with corresponding mixer signals.

18 Claims, 20 Drawing Sheets

(56) References Cited

U.S. PATENT DOCUMENTS

| | | | |
|---|---|---|---|
| 2008/0287163 A1* | 11/2008 | Skarby | H04W 88/08 455/562.1 |
| 2008/0317464 A1* | 12/2008 | Li | H04W 88/08 398/43 |
| 2009/0110088 A1* | 4/2009 | Di Giandomenico | H04L 12/2856 375/260 |
| 2009/0117859 A1* | 5/2009 | Smith | H04B 7/0413 455/78 |
| 2010/0197261 A1* | 8/2010 | Zibrik | H04B 7/0871 455/232.1 |
| 2011/0200030 A1* | 8/2011 | Noh | H04L 1/0643 370/344 |
| 2012/0027111 A1* | 2/2012 | Vook | H04B 7/0452 375/267 |
| 2012/0219085 A1* | 8/2012 | Long | H04L 25/14 375/295 |
| 2012/0290296 A1* | 11/2012 | Sugiyama | G10L 21/0208 704/226 |
| 2012/0321004 A1* | 12/2012 | Soul | H03J 7/04 375/259 |
| 2013/0301454 A1* | 11/2013 | Seol | H04B 7/043 370/252 |
| 2013/0321206 A1* | 12/2013 | Chang | H01Q 3/34 342/372 |
| 2013/0343499 A1* | 12/2013 | Ren | H04L 5/1469 375/349 |
| 2014/0087667 A1* | 3/2014 | Ben Atar | H04B 15/00 455/63.1 |
| 2014/0133435 A1* | 5/2014 | Forenza | H04B 7/0626 370/329 |
| 2014/0254578 A1* | 9/2014 | Yamaura | H04B 7/0417 370/338 |
| 2014/0307699 A1* | 10/2014 | Sorrentino | H04L 5/0007 370/329 |
| 2014/0376355 A1* | 12/2014 | Kudo | H04B 7/0456 370/203 |
| 2015/0029906 A1* | 1/2015 | Jana | H04L 5/0073 370/278 |
| 2015/0125155 A1* | 5/2015 | Gupta | H04L 27/2096 398/115 |
| 2015/0194999 A1* | 7/2015 | Lea | H01Q 21/24 455/562.1 |
| 2015/0237522 A1* | 8/2015 | Takano | H04W 24/10 370/329 |
| 2015/0244548 A1* | 8/2015 | Weissman | H04B 15/04 455/42 |
| 2015/0289065 A1* | 10/2015 | Jensen | H04R 25/552 381/315 |
| 2015/0380814 A1* | 12/2015 | Boutayeb | H01Q 3/24 343/776 |
| 2016/0003930 A1* | 1/2016 | Swope | G06K 7/10475 342/368 |
| 2016/0119038 A1* | 4/2016 | Thomas | H04B 7/043 370/329 |
| 2016/0173176 A1* | 6/2016 | Mizusawa | H04B 7/0456 375/267 |
| 2016/0198446 A1* | 7/2016 | Wild | H04L 5/0037 370/330 |
| 2017/0214440 A1* | 7/2017 | Mao | H04B 7/0634 |

\* cited by examiner

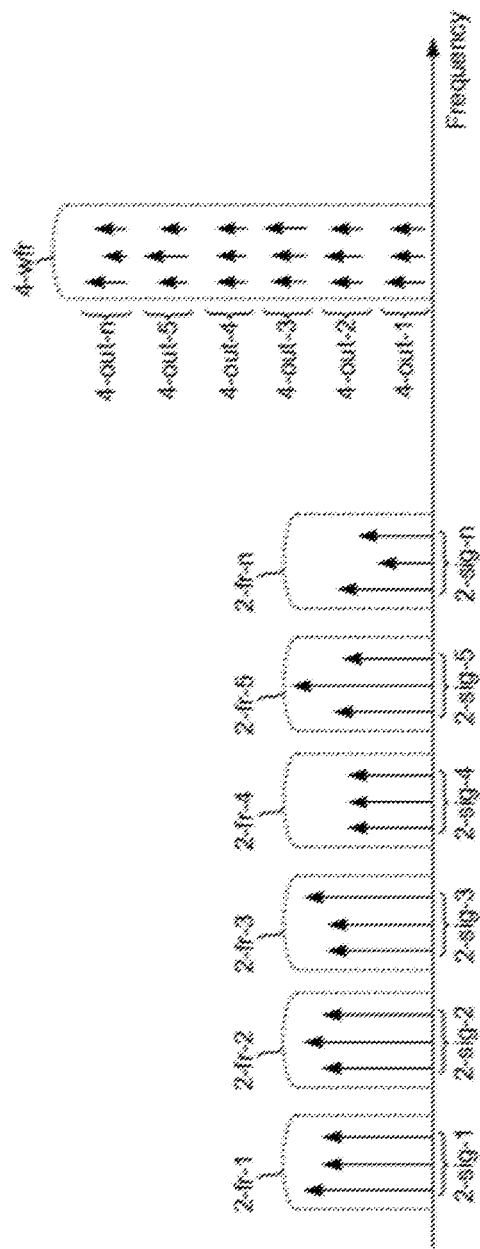
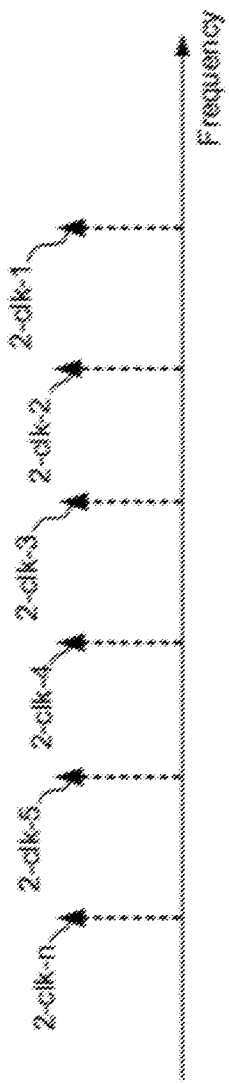
FIG. 1B
FIG. 1C

SYSTEMS AND METHODS FOR WIRELESS COMMUNICATION USING A WIRE-BASED MEDIUM

RELATED APPLICATIONS

The present application is related to and claims priority to U.S. Provisional Application No. 62/209,404, filed on Aug. 25, 2015, entitled "Systems and Methods for Wireless Communication Using a Wire-Based Medium," which is hereby incorporated by reference.

TECHNICAL FIELD

The present application relates to the field of wireless communication. More specifically, it relates to wireless communication systems and methods using a wire-based medium.

BACKGROUND

Wireless communication with mobile devices may be adversely affected by signal fading, multi-path, electromagnetic wave propagation through walls, and other such phenomena. Needed are methods and systems to better facilitate wireless communication.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

One or more embodiments are directed to a method for using spatial multiplexing to mitigate wire-based interferences;

One or more embodiments are directed to a method for using spatial multiplexing in conjunction with a wire-based medium;

One or more embodiments are directed to a method for re-using a plurality of streams associated with spatial multiplexing and transported over a wire-based medium;

One or more embodiments are directed to a method for preventing a first wireless transmission from interfering with a second wireless transmission both transported over a wire-based medium;

One or more embodiments are directed to a method for covering wirelessly multiple spatial locations via a wire-based medium using grouping of streams associated with spatial multiplexing;

One or more embodiments are directed to a method for achieving spatial-division-multiple-access via a wire-based medium by grouping of streams in conjunction with a plurality of spatial locations;

One or more embodiments are directed to a method for using wireless frame aggregation to mitigate wire-based interferences;

One or more embodiments are directed to a method for transporting a plurality of streams associated with spatial multiplexing over a wire-based medium together with corresponding mixer signals;

One or more embodiments are directed to a system configured to facilitate spatial multiplexing to mitigate wire-based interferences;

One or more embodiments are directed to a system configured to use spatial multiplexing in conjunction with a wire-based medium;

One or more embodiments are directed to a system configured to re-use a plurality of streams associated with spatial multiplexing and transported over a wire-based medium;

One or more embodiments are directed to a system configured to prevent a first wireless transmission from interfering with a second wireless transmission both transported over a wire-based medium;

One or more embodiments are directed to a system configured to cover wirelessly multiple spatial locations via a wire-based medium using grouping of streams associated with spatial multiplexing;

One or more embodiments are directed to a system configured to achieve spatial-division-multiple-access via a wire-based medium by grouping of streams in conjunction with a plurality of spatial locations;

One or more embodiments are directed to a system configured to use wireless frame aggregation to mitigate wire-based interferences; and One or more embodiments are directed to a system configured to transport a plurality of streams associated with spatial multiplexing over a wire-based medium together with corresponding mixer signals.

One or more embodiments are directed to a method for using spatial multiplexing to mitigate wire-based interferences. The method comprises converting, by a base converter, a plurality of input streams into a respective plurality of signals occupying different frequency ranges, in which the plurality of input streams are associated with spatial multiplexing; transporting, by the base converter, the plurality of input signals via a wire-based medium respectively to a plurality of mixers, in which an interference associated with the wire-based medium affects at least one of the signals in one of the frequency ranges, but not all of the signals in all of the frequency ranges; shifting, by each of the plurality of mixers, the respective one of the signals from the respective frequency range to a single wireless frequency range, thereby creating, respectively, a plurality of output signals, each of the plurality of output signals occupying the single wireless frequency range and corresponding to the respective one of the plurality of input streams; and transmitting wirelessly the plurality of output signals respectively via a plurality of antennas thereby achieving spatial multiplexing in conjunction with the plurality of output signals all occupying the single wireless frequency range, wherein at least one of the plurality of output signals transmitted wirelessly is affected by the interference, but not all of the output signals are affected by the interference, thereby facilitating successful decoding of N data streams associated with the spatial multiplexing.

One or more embodiments are directed to a system operative to use spatial multiplexing in conjunction with a wire-based medium. The system comprises an access point; a base converter; a wire-based medium; and a plurality of antennas; wherein the system is configured to: convert a plurality of streams associated with spatial multiplexing, respectively, into a plurality of signals occupying respectively a plurality of different frequencies; transport the plurality of signals, in conjunction with the plurality of different frequencies, via a wire-based medium; shift the plurality of signals into, respectively, a plurality of output signals, in which all said output signals occupy a single wireless frequency, in which said shift is achieved by up-converting each one of the signals from the corresponding one of the different frequencies into the single wireless frequency; and transmit wirelessly, using only the single wireless frequency, the plurality of output signals, respectively, via a plurality of antennas all operating in conjunction with the single wireless frequency, thereby achieving spatial multiplexing in conjunction with the wire-based medium.

IN THE DRAWINGS

The embodiments are herein described, by way of example only, with reference to the accompanying drawings. No attempt is made to show structural details of the embodiments in more detail than is necessary for a fundamental understanding of the embodiments. In the drawings:

FIG. 1A illustrates one embodiment of a system operative to: convert a plurality of streams associated with spatial multiplexing into a plurality of signals, transport the plurality of signals via a wire-based medium, shift the plurality of signals into a plurality of output signals occupying a single wireless frequency range, and transmit wirelessly the output signals, thereby achieving spatial multiplexing in conjunction with the wire-based medium;

DETAILED DESCRIPTION

The following paragraphs are associated with FIG. 2A, FIG. 2B, FIG. 2C, FIG. 7A, FIG. 7B.

Figure 2A:
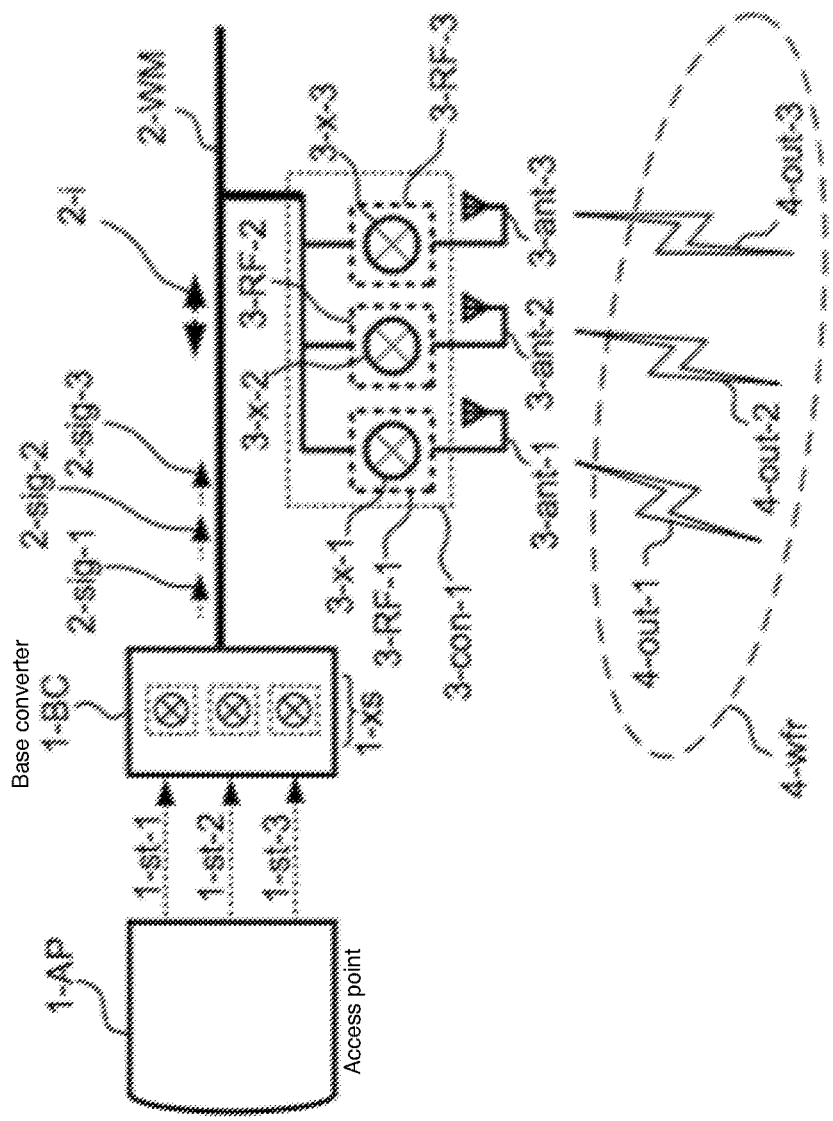
FIG. 2A illustrates one embodiment of a system operative to use spatial multiplexing to mitigate wire-based interferences.
Figure 2B:
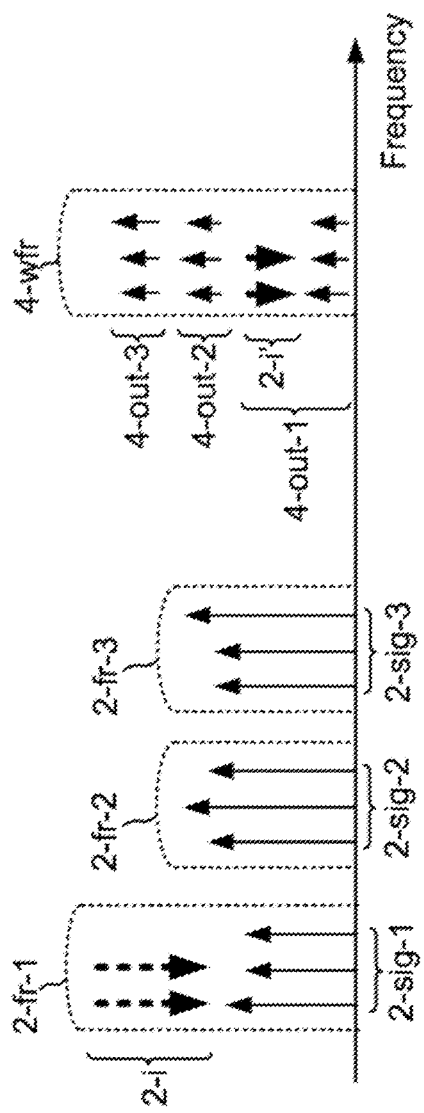
FIG. 2B illustrates one embodiment of different signals occupying various frequencies in conjunction with the system operative to use spatial multiplexing to mitigate wire-based interferences.
Figure 7A:
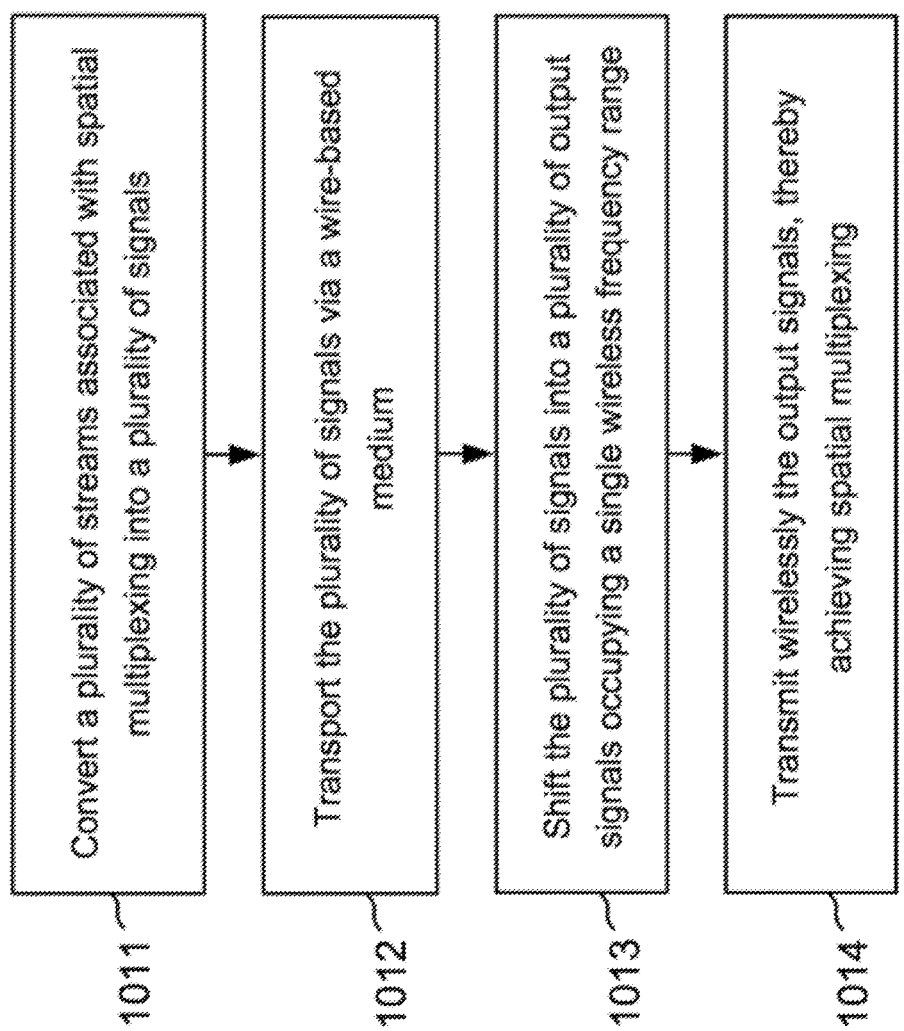
FIG. 7A illustrates one embodiment of a method for using spatial multiplexing in conjunction with a wire-based medium.
Figure 7B:
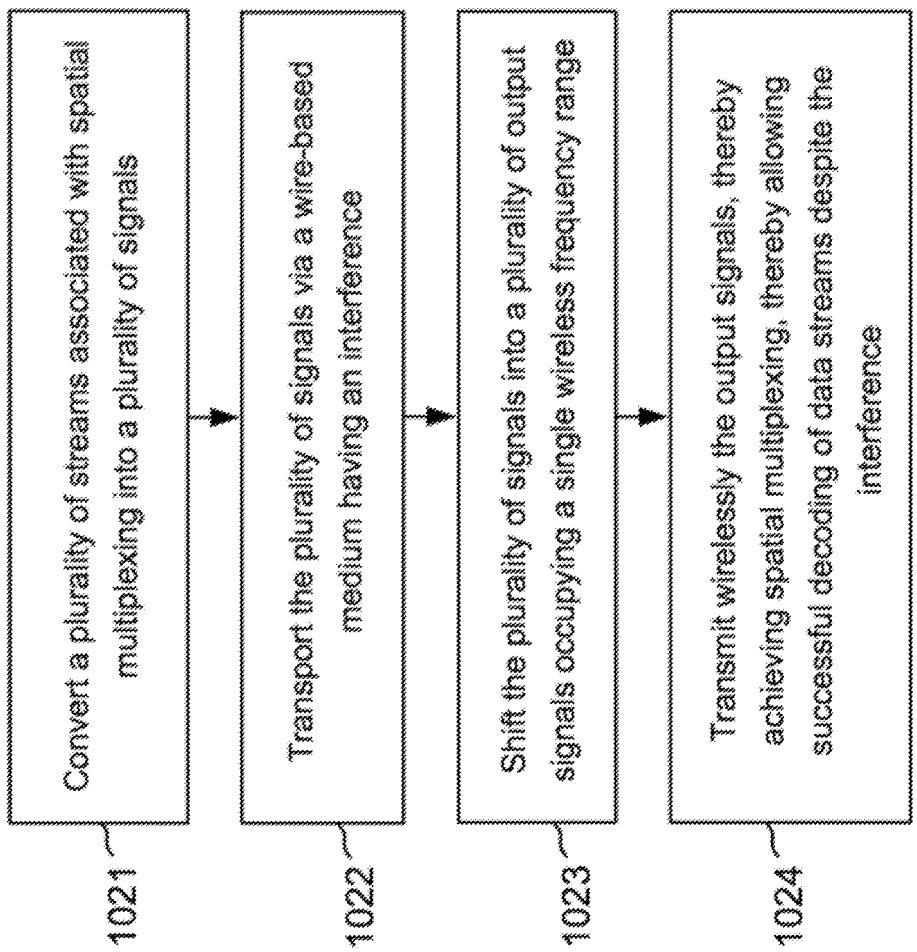
FIG. 7B illustrates one embodiment of a method for using spatial multiplexing to mitigate wire-based interferences.

FIG. 7B illustrates one embodiment of a method for using spatial multiplexing to mitigate wire-based interferences. In step 1021, converting, by a base converter 1-BC, a plurality of streams 1-*st*-1, 1-*st*-2, 1-*st*-3 respectively into a plurality of signals 2-*sig*-1, 2-*sig*-2, 2-*sig*-3 occupying respectively a plurality of different frequency ranges 2-*fr*-1, 2-*fr*-2, 2-*fr*-3, in which the plurality of streams are associated with spatial multiplexing, as illustrated in FIG. 2A. In step 1022, transporting, by the base converter 1-BC, the plurality of signals 2-*sig*-1, 2-*sig*-2, 2-*sig*-3 via a wire-based medium 2-WM respectively to a plurality of mixers 3-*x*-1, 3-*x*-2, 3-*x*-3, in which an interference 2-*i* (FIG. 2A) associated with the wire-based medium 2-WM affects at least one of the signals 2-*sig*-1 in one of the frequency ranges 2-*fr*-1, but not all of the signals in all of the frequency ranges. In step 1023, shifting, by each of the plurality of mixers 3-*x*-1, 3-*x*-2, 3-*x*-3, the respective one of the signals from the respective frequency range to a single wireless frequency range 4-*wfr* (i.e., 3-*x*-1 is shifting 2-*sig*-1 from 2-*fr*-1 to 4-*wfr*, 3-*x*-2 is shifting 2-*sig*-2 from 2-*fr*-2 to 4-*wfr*, and 3-*x*-3 is shifting 2-*sig*-3 from 2-*fr*-3 to 4-*wfr*), thereby creating, respectively, a plurality of output signals 4-*out*-1, 4-*out*-2, 4-*out*-3 each occupying the single wireless frequency range 4-*wfr* and corresponding to the respective stream (i.e. 4-*out*-1 corresponding to 1-*st*-1, 4-*out*-2 corresponding to 1-*st*-2, and 4-*out*-3 corresponding to 1-*st*-3). In step 1024, transmitting wirelessly the plurality of output signals 4-*out*-1, 4-*out*-2, 4-*out*-3 respectively via a plurality of antennas 3-*ant*-1, 3-*ant*-2, 3-*ant*-3 thereby achieving spatial multiplexing in conjunction with the plurality of output signals 4-*out*-1, 4-*out*-2, 4-*out*-3 all occupying the single wireless frequency range 4-*wfr*, wherein at least one of the plurality of output signals 4-*out*-1 transmitted wirelessly is affected 2-*i'* (FIG. 2B) by the interference 2-*i* (since 4-*out*-1 is derived from 2-*sig*-1 which was affected by the interference 2-*i*), but not all of the output signals are affected by the interference, thereby facilitating successful decoding of N data streams 1-*ds*-1, 1-*ds*-2 associated with the spatial multiplexing.

Figure 2C:
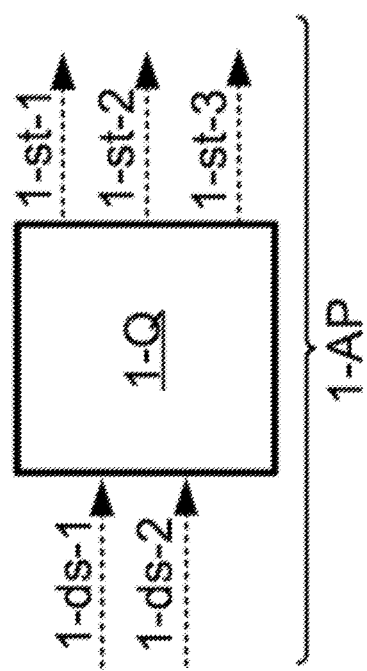
FIG. 2C illustrates one embodiment of a spatial expansion element.

One embodiment further comprises: generating, by an access point 1-AP, the plurality of streams 1-*st*-1, 1-*st*-2, 1-*st*-3, out of the N data streams 1-*ds*-1, 1-*ds*-2, using a spatial expansion element 1-Q, wherein: the N data streams 1-*ds*-1, 1-*ds*-2 (e.g. N=2) are mapped into the plurality of streams 1-*st*-1, 1-*st*-2, 1-*st*-3 comprising M streams (e.g. M=3), such that M is equal to N, or M is greater than N, in which the interference 2-*i* causes the access point 1-AP to decrease N relative to M, up to a point that facilitates said successful decoding of the N data streams 1-*ds*-1, 1-*ds*-2 associated with the spatial multiplexing, thereby essentially overcoming the interference 2-*i*. An example of such an embodiment is illustrated in FIG. 2C.

In one embodiment, the access point 1-AP is a Wi-Fi access point supporting at least partly a standard associated with IEEE 802.11, such as IEEE 802.11n or IEEE 802.11ac, in which the spatial multiplexing in conjunction with plurality of streams 1-*st*-1, 1-*st*-2, 1-*st*-3 is part of the standard.

In one embodiment, the plurality of output signals 4-*out*-1, 4-*out*-2, 4-*out*-3 are orthogonal frequency-division multiplexing (OFDM) signals, thereby further overcoming the interference 2-*i* in conjunction with the spatial multiplexing.

In one embodiment, the access point 1-AP is an Long-Term Evolution (LTE) access point or an LTE base-station supporting at least partly a standard associated with LTE, in which the spatial multiplexing in conjunction with plurality of streams 1-*st*-1, 1-*st*-2, 1-*st*-3 is part of the standard.

In one embodiment, said interference 2-*i* is associated with noise on the wire-based medium 2-WM.

In one embodiment, the interference 2-*i* is associated with signal reflections associated with the wire-based medium 2-WM, in which the signal reflections adversely affect a transfer function associated with the wire-based medium 2-WM in one of the frequency ranges 2-*fr*-1 associated with one of the signals 2-*sig*-1.

In one embodiment, the wire-based medium 2-WM is selected from a group consisting of: (i) a coaxial cable, (ii) a twisted-pair cable, (iii) category-5 cable, and (iv) any cable capable of facilitating propagation of electromagnetic signals.

In one embodiment, the wire-based medium 2-WM is a coaxial cable deployed in-house; the plurality of mixers 3-*x*-1, 3-*x*-2, 3-*x*-3 are associated respectively with a plurality of radio-frequency chains 3-RF-1, 3-RF-2, 3-RF-3 operative together to facilitate said shifting of the plurality of signals 2-*sig*-1, 2-*sig*-2, 2-*sig*-3 to the single wireless frequency range 4-*wfr*; and the plurality of radio-frequency chains 3-RF-1, 3-RF-2, 3-RF-3 are housed in at least a single converter 3-*con*-1 placed in a room in-house, or are housed respectively in a plurality of converters placed in a plurality of rooms in-house.

In one embodiment, the interference 2-*i* is associated with signals injected into the coaxial cable by in-house electronic appliances.

In one embodiment, the interference 2-*i* is associated with reflections produced by in-house stubs of the coaxial cable.

In one embodiment, the plurality of different frequency ranges 2-*fr*-1, 2-*fr*-2, 2-*fr*-3 are located below 1.5 GHz, at frequency zones that are, at least momentarily, not occupied by in-house coaxial signals such as Data Over Cable Service Interface Specification (DOCSIS) signals, Multimedia over Coax Alliance (MoCA) signals, and cable TV signals.

In one embodiment, the plurality of streams 1-*st*-1, 1-*st*-2, 1-*st*-3 are input to the base converter 1-BC in a radio frequency form at frequency bands above 1.5 GHz, such as a 1.8 GHz band, a 1.9 GHz band, a 2.0 GHz band, a 2.3 GHz band, a 2.4 GHz band, a 2.5 GHz band, or a 5 GHz band; and said conversion of the plurality of streams 1-*st*-1, 1-*st*-2, 1-*st*-3 respectively into the plurality of signals 2-*sig*-1, 2-*sig*-2, 2-*sig*-3 is performed respectively by a plurality of mixers 1-*xs* in the base converter 1-BC operating as down-converters.

In one embodiment, the plurality of streams 1-*st*-1, 1-*st*-2, 1-*st*-3 are input to the base converter 1-BC in a base-band form; and said conversion of the plurality of streams 1-*st*-1, 1-*st*-2, 1-*st*-3 respectively into the plurality of signals 2-*sig*-1, 2-*sig*-2, 2-*sig*-3 is performed respectively by a plurality of mixers 1-*xs* in the base converter 1-BC operating as up-converters.

In one embodiment, the plurality of streams 1-*st*-1, 1-*st*-2, 1-*st*-3 are input to the base converter 1-BC in a digital form; and said conversion of the plurality of streams 1-*st*-1, 1-*st*-2, 1-*st*-3 respectively into the plurality of signals 2-*sig*-1, 2-*sig*-2, 2-*sig*-3 is a modulation process, such as OFDM modulation process.

One embodiment further comprising: generating, by an access point 1-AP, the plurality of streams 1-*st*-1, 1-*st*-2, 1-*st*-3, out of the N data streams 1-*ds*-1, 1-*ds*-2, wherein: the access point 1-AP is a Wi-Fi access point supporting at least partly a standard associated with IEEE 802.11, such as IEEE 802.11n or IEEE 802.11ac, in which the spatial multiplexing in conjunction with plurality of streams 1-*st*-1, 1-*st*-2, 1-*st*-3 is part of the standard.

In one embodiment, the plurality of output signals 4-*out*-1, 4-*out*-2, 4-*out*-3 all occupying the single wireless frequency range 4-*wfr* are associated with the standard.

In one embodiment, the single wireless frequency range 4-*wfr* is a single channel associated with the standard.

In one embodiment, the single channel is associated with an unlicensed industrial, scientific and medical (ISM) band selected from a group of unlicensed bands consisting of (i) the 2.4 GHz band, and (ii) the 5 GHz band.

In one embodiment, the plurality of output signals 4-*out*-1, 4-*out*-2, 4-*out*-3 are OFDM signals.

One embodiment further comprising: generating, by an access point 1-AP, the plurality of streams 1-*st*-1, 1-*st*-2, 1-*st*-3, out of the N data streams 1-*ds*-1, 1-*ds*-2, wherein: the access point 1-AP is an LTE access point supporting at least partly a standard associated with LTE, in which the spatial multiplexing in conjunction with plurality of streams 1-*st*-1, 1-*st*-2, 1-*st*-3 is part of the standard.

In one embodiment, the plurality of output signals 4-*out*-1, 4-*out*-2, 4-*out*-3 all occupying the single wireless frequency range 4-*wfr* are associated with the standard.

In one embodiment, the single wireless frequency range 4-*wfr* is a single channel associated with the standard.

In one embodiment, the single channel is associated with a licensed band selected from a group of licensed bands consisting of (i) the 1.8 GHz band, (ii) the 1.9 GHz band, and (iii) the 2.0 GHz band.

In one embodiment, the plurality of output signals 4-*out*-1, 4-*out*-2, 4-*out*-3 are orthogonal frequency-division multiple access (OFDMA) signals.

One embodiment is a system 1-AP, 1-BC, 2-WM, 3-*x*-1, 3-*x*-2, 3-*x*-3, 3-*ant*-1, 3-*ant*-2, 3-*ant*-3, 1-Q, configured to facilitate spatial multiplexing to mitigate wire-based interferences.

FIG. 7A illustrates one embodiment of a method for using spatial multiplexing in conjunction with a wire-based medium. In step 1011, Converting a plurality of streams 1-*st*-1, 1-*st*-2, 1-*st*-3, 1-*st*-4, 1-*st*-5, 1-*st*-*n* associated with spatial multiplexing, respectively, into a plurality of signals 2-*sig*-1, 2-*sig*-2, 2-*sig*-3, 2-*sig*-4, 2-*sig*-5, 2-*sig*-*n* occupying respectively a plurality of different frequencies 2-*fr*-1, 2-*fr*-2, 2-*fr*-3, 2-*fr*-4, 2-*fr*-5, 2-*fr*-*n*. In step 1012, Transporting the plurality of signals via a wire-based medium 2-WM. In step 1013, Shifting the plurality of signals into, respectively, a plurality of output signals 4-*out*-1, 4-*out*-2, 4-*out*-3, 4-*out*-4, 4-*out*-5, 4-*out*-*n* all occupying a single wireless frequency 4-*wfr*. In step 1014, Transmitting wirelessly the plurality of output signals, respectively, via a plurality of antennas 3-*ant*-1, 3-*ant*-2, 3-*ant*-3, 3-*ant*-4, 3-*ant*-5, 3-*ant*-*n*, thereby achieving spatial multiplexing in conjunction with the wire-based medium.

Figure 1A:
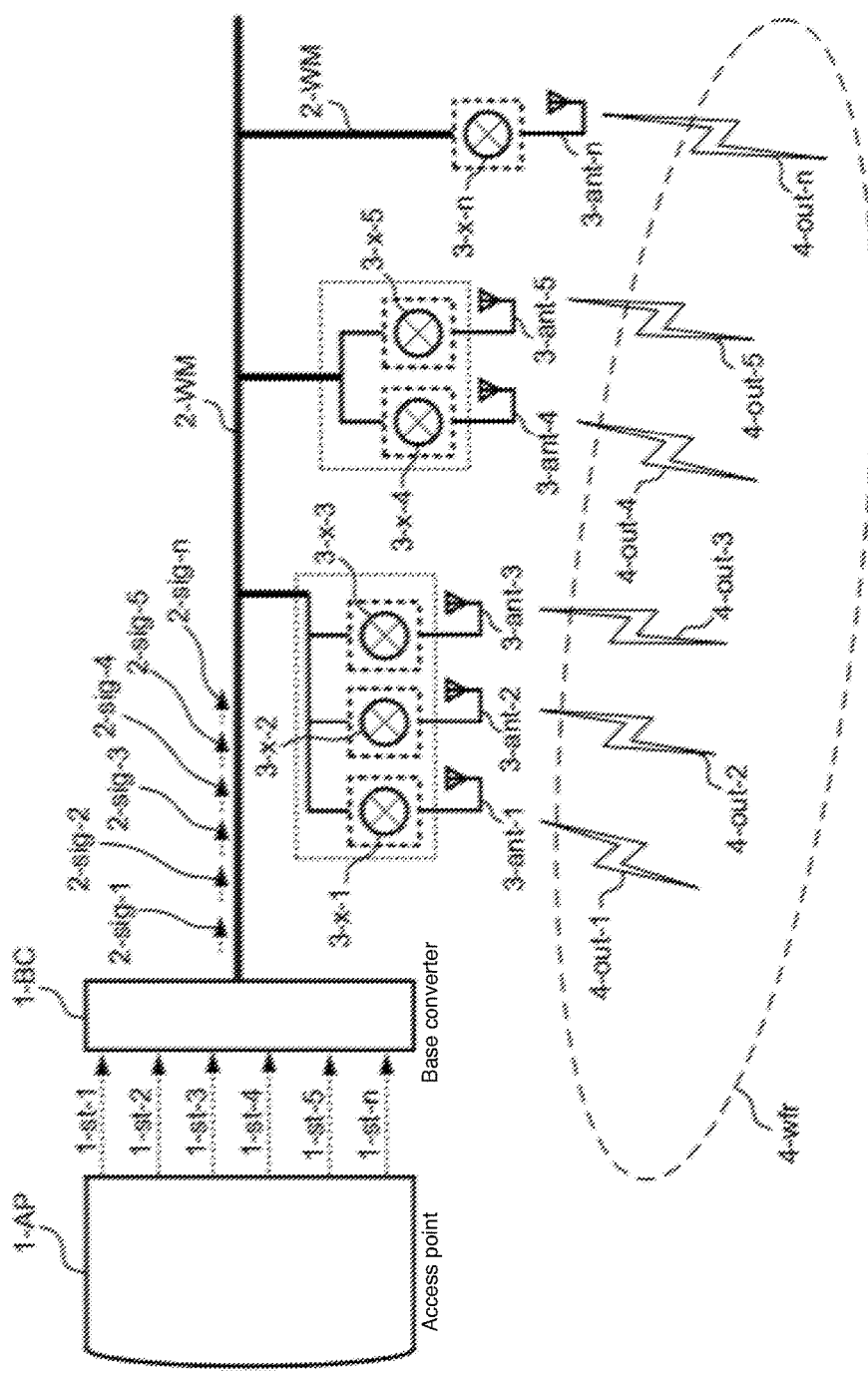
FIG. 1B illustrates one embodiment of the frequencies occupied by the plurality of signals transported via a wire-based medium, and the single wireless frequency occupied by the plurality of output signals.
FIG. 1C illustrates one embodiment of a plurality of mixer signals.

One embodiment is a system (FIG. 1A) operative to use spatial multiplexing in conjunction with a wire-based medium, for example as illustrated in FIG. FIG. 2A. The system includes: an access point 1-AP, a base converter 1-BC, a wire-based medium 2-WM, and a plurality of antennas 3-*ant*-1, 3-*ant*-2, 3-*ant*-3, 3-*ant*-4, 3-*ant*-5, 3-*ant*-*n*. The system is configured to:

convert a plurality of streams 1-*st*-1, 1-*st*-2, 1-*st*-3, 1-*st*-4, 1-*st*-5, 1-*st*-*n* associated with spatial multiplexing, respectively, into a plurality of signals 2-*sig*-1, 2-*sig*-2, 2-*sig*-3, 2-*sig*-4, 2-*sig*-5, 2-*sig*-*n* occupying respectively a plurality of different frequencies 2-*fr*-1, 2-*fr*-2, 2-*fr*-3, 2-*fr*-4, 2-*fr*-5, 2-*fr*-*n*;

transport the plurality of signals 2-*sig*-1, 2-*sig*-2, 2-*sig*-3, 2-*sig*-4, 2-*sig*-5, 2-*sig*-*n*, in conjunction with the plurality of different frequencies 2-*fr*-1, 2-*fr*-2, 2-*fr*-3, 2-*fr*-4, 2-*fr*-5, 2-*fr*-*n*, via the wire-based medium 2-WM;

shift the plurality of signals 2-*sig*-1, 2-*sig*-2, 2-*sig*-3, 2-*sig*-4, 2-*sig*-5, 2-*sig*-*n* into, respectively, a plurality of output signals 4-*out*-1, 4-*out*-2, 4-*out*-3, 4-*out*-4, 4-*out*-5, 4-*out*-*n*, in which all said output signals occupy a single wireless frequency 4-*wfr*, in which said shift is achieved by up-converting each one of the signals 2-*sig*-1, 2-*sig*-2, 2-*sig*-3, 2-*sig*-4, 2-*sig*-5, 2-*sig*-*n* from the corresponding one of the different frequencies 2-*fr*-1, 2-*fr*-2, 2-*fr*-3, 2-*fr*-4, 2-*fr*-5, 2-*fr*-*n* into the single wireless frequency 4-*wfr*; and transmit wirelessly, using only the single wireless frequency 4-*wfr*, the plurality of output signals 4-*out*-1, 4-*out*-2, 4-*out*-3, 4-*out*-4, 4-*out*-5, 4-*out*-*n*, respectively, via the plurality of antennas 3-*ant*-1, 3-*ant*-2, 3-*ant*-3, 3-*ant*-4, 3-*ant*-5, 3-*ant*-*n* all operating in conjunction with the single wireless frequency 4-*wfr*, thereby achieving spatial multiplexing in conjunction with the wire-based medium 2-WM.

Figure 3A:
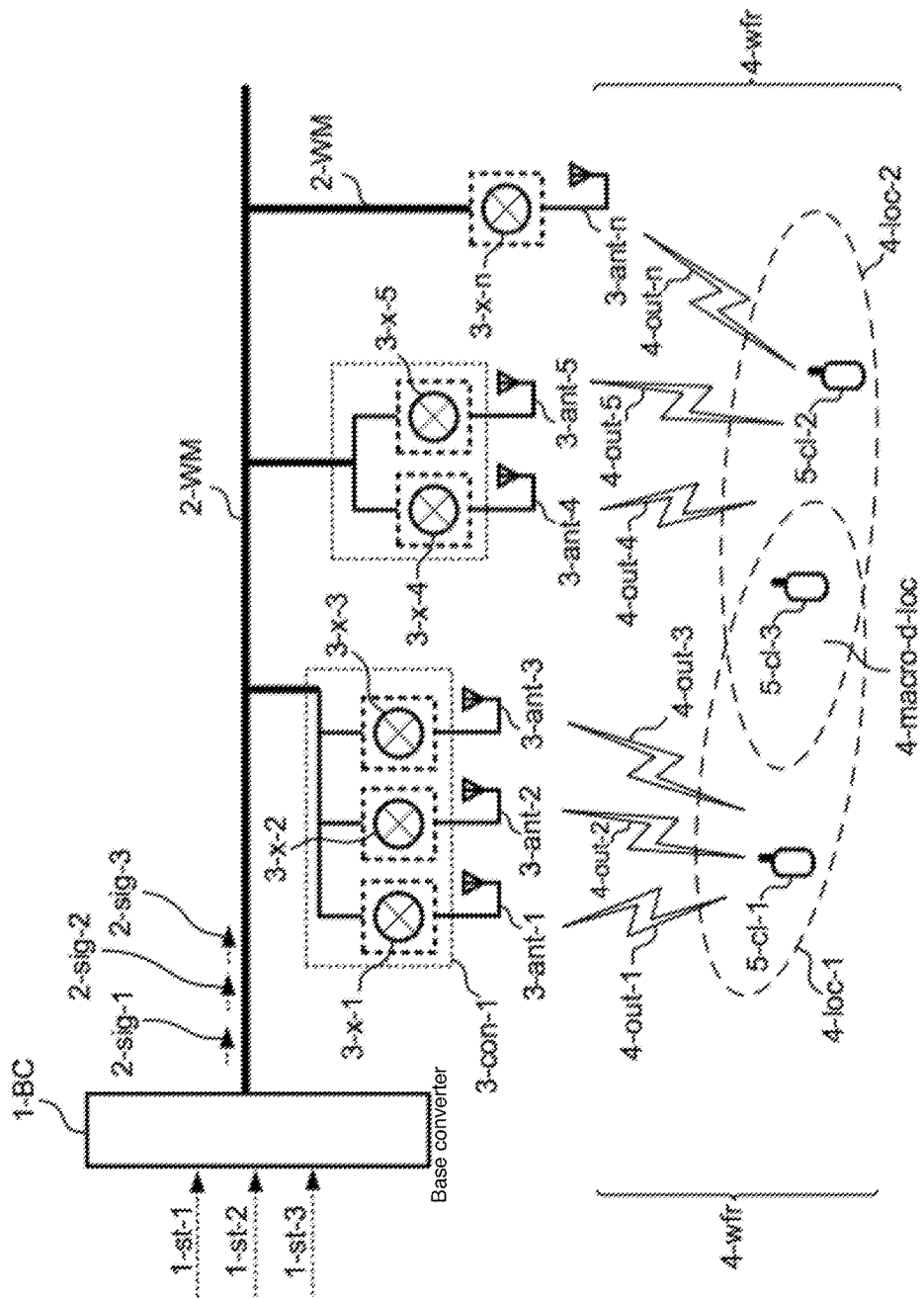
FIG. 3A illustrates one embodiment of a system operative to re-use a plurality of streams associated with spatial multiplexing and transported over a wire-based medium.
Figure 8:
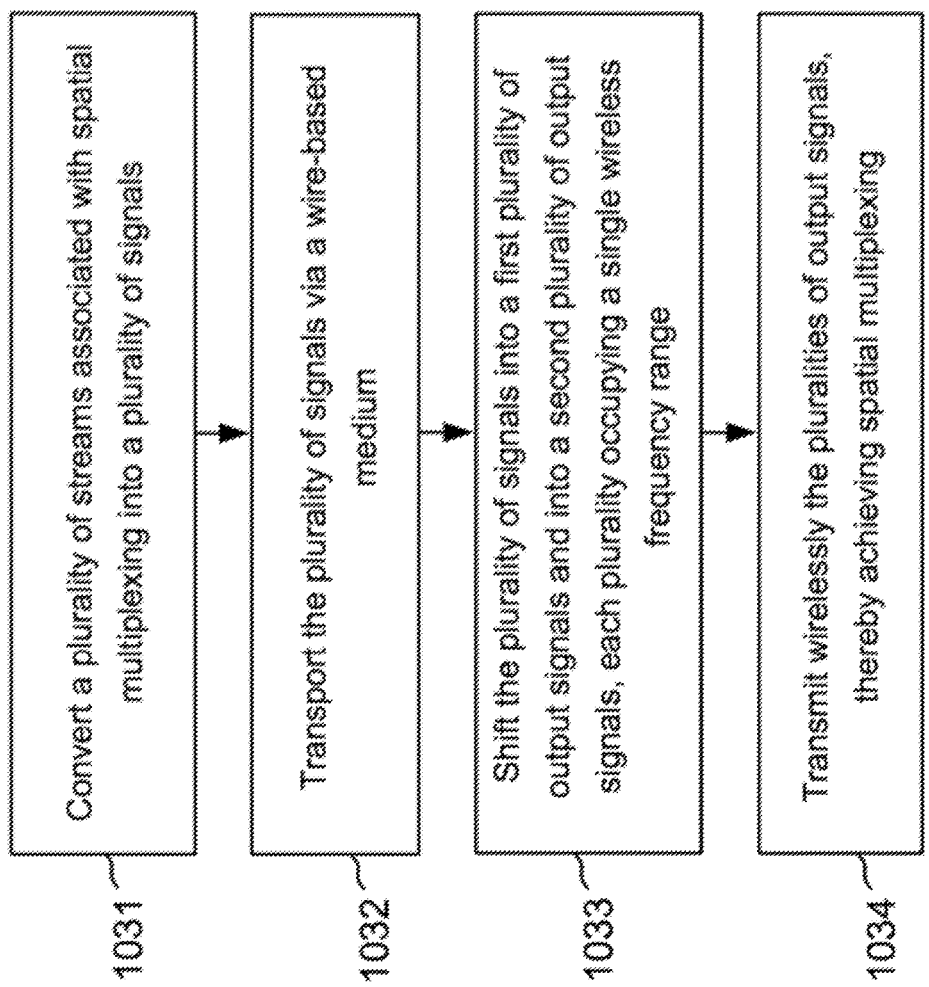
FIG. 8 illustrates one embodiment of a method for re-using a plurality of streams associated with spatial multiplexing and transported over a wire-based medium.

The following paragraphs are associated with FIG. 3A, FIG. 8.

FIG. 8 illustrates one embodiment of a method for re-using a plurality of streams associated with spatial multiplexing and transported over a wire-based medium. In step 1031, converting, by a base converter 1-BC, a plurality of streams 1-*st*-1, 1-*st*-2, 1-*st*-3 respectively into a plurality of signals 2-*sig*-1, 2-*sig*-2, 2-*sig*-3 occupying respectively a plurality of different frequency ranges 2-*fr*-1, 2-*fr*-2, 2-*fr*-3, in which the plurality of streams are associated with spatial multiplexing, as illustrated in FIG. 3A. In step 1032, transporting, by the base converter 1-BC, the plurality of signals 2-*sig*-1, 2-*sig*-2, 2-*sig*-3 via a wire-based medium 2-WM respectively to a first plurality of mixers 3-*x*-1, 3-*x*-2, 3-*x*-3, and respectively to a second plurality of mixers 3-*x*-4, 3-*x*-5, 3-*x*-*n*. In step 1033, shifting, by each of the first plurality of mixers 3-*x*-1, 3-*x*-2, 3-*x*-3, the respective one of the signals from the respective frequency range to a single wireless frequency range 4-*wfr* (i.e., 3-*x*-1 is shifting 2-*sig*-1 from 2-*fr*-1 to 4-*wfr*, 3-*x*-2 is shifting 2-*sig*-2 from 2-*fr*-2 to 4-*wfr*, and 3-*x*-3 is shifting 2-*sig*-3 from 2-*fr*-3 to 4-*wfr*), thereby creating, respectively, a first plurality of output signals 4-*out*-1, 4-*out*-2, 4-*out*-3 each occupying the single wireless frequency range 4-*wfr* and corresponding to the respective stream (i.e. 4-*out*-1 corresponding to 1-*st*-1, 4-*out*-2 corresponding to 1-*st*-2, and 4-*out*-3 corresponding to 1-*st*-3), and shifting, by each of the second plurality of mixers 3-*x*-4, 3-*x*-5, 3-*x*-*n*, the respective one of the signals from the respective frequency range to the single wireless frequency range 4-*wfr* (i.e., 3-*x*-4 is shifting 2-*sig*-1 from 2-*fr*-1 to 4-*wfr*, 3-*x*-5 is shifting 2-*sig*-2 from 2-*fr*-2 to 4-*wfr*, and 3-*x*-*n* is shifting 2-*sig*-3 from 2-*fr*-3 to 4-*wfr*), thereby creating, respectively, a second plurality of output signals 4-*out*-4, 4-*out*-5, 4-*out*-*n* each occupying the single wireless frequency range 4-*wfr* and corresponding to the respective stream (i.e. 4-*out*-4 corresponding to 1-*st*-1, 4-*out*-5 corresponding to 1-*st*-2, and 4-*out*-*n* corresponding to 1-*st*-3). In step 1034, transmitting wirelessly the first plurality of output signals 4-*out*-1, 4-*out*-2, 4-*out*-3 via a first plurality of antennas 3-*ant*-1, 3-*ant*-2, 3-*ant*-3 thereby achieving spatial multiplexing in conjunction with the first plurality of output signals all occupying the single wireless frequency range 4-*wfr*, and transmitting wirelessly the second plurality of output signals 4-*out*-4, 4-*out*-5, 4-*out*-*n* via a second plurality of antennas 3-*ant*-4, 3-*ant*-5, 3-*ant*-*n*, thereby achieving spatial multiplexing in conjunction with the second plurality of output signals all occupying the single wireless frequency range 4-*wfr*.

In one embodiment, the first plurality of output signals 4-*out*-1, 4-*out*-2, 4-*out*-3 transmitted wirelessly and the second plurality of output signals 4-*out*-4, 4-*out*-5, 4-*out*-*n* transmitted wirelessly, all occupying the single wireless frequency range 4-*wfr*, are combined wirelessly at different spatial locations 4-*macro-d-loc* such as to create macro-diversity in conjunction with the spatial multiplexing.

In one embodiment, the first plurality of output signals 4-*out*-1, 4-*out*-2, 4-*out*-3 and the second plurality of output signals 4-*out*-4, 4-*out*-5, 4-*out*-*n* are received and decoded in conjunction with said macro-diversity by a client device 5-*cl*-3 located in one of the different spatial locations 4-*macro-d-loc*.

In one embodiment, the plurality of signals 2-*sig*-1, 2-*sig*-2, 2-*sig*-3, the first plurality of output signals 4-*out*-1, 4-*out*-2, 4-*out*-3, and the second plurality of output signals 4-*out*-4, 4-*out*-5, 4-*out*-*n*, are OFDM or OFDMA signals associated with a standard selected from a group consisting of (i) Wi-Fi, (ii) WiMAX, and (iii) LTE, in which a plurality of sub-carriers in the plurality of signals and in the pluralities of output signals facilitate said macro-diversity in conjunction with the spatial multiplexing.

In one embodiment, the first plurality of output signals 4-*out*-1, 4-*out*-2, 4-*out*-3 transmitted wirelessly are associated with a first spatial location 4-*loc*-1, and the second plurality of output signals 4-*out*-4, 4-*out*-5, 4-*out*-n transmitted wirelessly are associated with a second spatial location 4-*loc*-2, such that a first client 5-*cl*-1 device associated with the first spatial location 4-*loc*-1 is able to decode data streams associated with the spatial multiplexing using the first plurality of output signals 4-*out*-1, 4-*out*-2, 4-*out*-3, and a second client device 5-*cl*-2 associated with the second spatial location 4-*loc*-2 is able to decode data streams associated with the spatial multiplexing using the second plurality of output signals 4-*out*-4, 4-*out*-5, 4-*out*-n.

In one embodiment, the wire-based medium 2-WM is a coaxial cable deployed in-house, in which the first spatial location 4-*loc*-1 is a first room in-house, and the second spatial location 4-*loc*-2 is a second room in-house.

In one embodiment, the first plurality of output signals 4-*out*-1, 4-*out*-2, 4-*out*-3 and the second plurality of output signals 4-*out*-4, 4-*out*-5, 4-*out*-n are associated with LTE in a licensed band and are transmitted each at a power level of below 10 (ten) dBm and above −30 (minus thirty) dBm, which is low enough to not interfere with outdoor LTE transmissions in the licensed band, but is also high enough to be received by the client devices 5-*cl*-1, 5-*cl*-2 in the different rooms 4-*loc*-1, 4-*loc*-2 as facilitated by the wire-based medium 2-WM.

In one embodiment, the first plurality of output signals 4-*out*-1, 4-*out*-2, 4-*out*-3 and the second plurality of output signals 4-*out*-4, 4-*out*-5, 4-*out*-n are associated with IEEE 802.11 and Wi-Fi in unlicensed band and are received by the client devices 5-*cl*-1, 5-*cl*-2 in the different rooms 4-*loc*-1, 4-*loc*-2 as facilitated by the wire-based medium 2-WM, thereby improving in-house Wi-Fi communication.

In one embodiment, the wire-based medium 2-WM is selected from a group consisting of: (i) a coaxial cable, (ii) a twisted-pair cable, (iii) category-5 cable, and (iv) any cable capable of facilitating propagation of electromagnetic signals.

One embodiment is a system 1-BC, 2-WM, 3-*x*-1, 3-*x*-2, 3-*x*-3, 3-*x*-4, 3-*x*-5, 3-*x*-n, 3-*ant*-1, 3-*ant*-2, 3-*ant*-3, 3-*ant*-4, 3-*ant*-5, 3-*ant*-n, configured to re-use a plurality of streams associated with spatial multiplexing and transported over a wire-based medium, for example as illustrated in FIG. 3A.

Figure 3B:
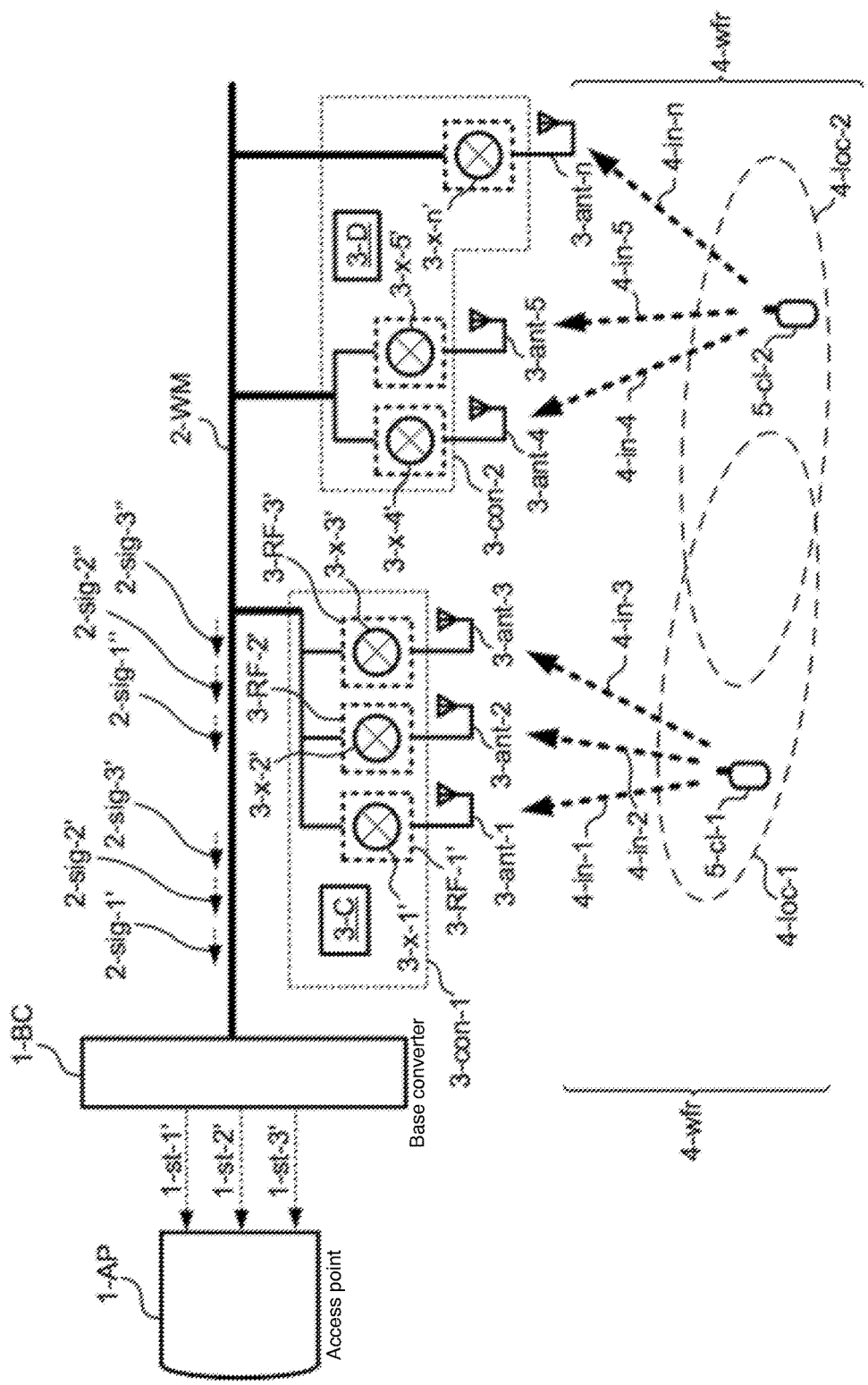
FIG. 3B illustrates one embodiment of a system operative to prevent a first wireless transmission from interfering with a second wireless transmission both transported over a wire-based medium.
Figure 9:
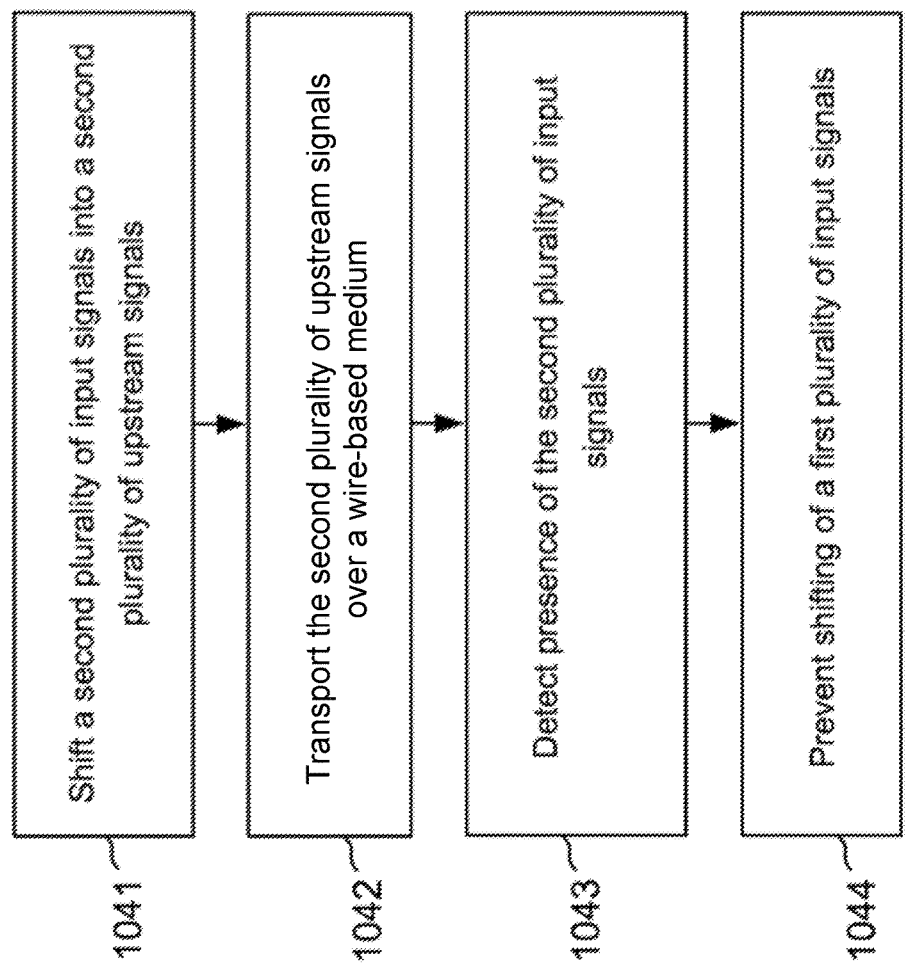
FIG. 9 illustrates one embodiment of a method for preventing a first wireless transmission from interfering with a second wireless transmission both transported over a wire-based medium.

The following paragraphs are associated with FIG. 3B, FIG. 9.

FIG. 9 illustrates one embodiment of a method for preventing a first wireless transmission from interfering with a second wireless transmission both transported over a wire-based medium. In step 1041, shifting, by a second plurality of mixers 3-*x*-4', 3-*x*-5', 3-*x*-n', respectively, a second plurality of input signals 4-*in*-4, 4-*in*-5, 4-*in*-n, each occupying a single wireless frequency range 4-*wfr*, respectively into a second plurality of upstream signals 2-*sig*-1", 2-*sig*-2", 2-*sig*-3" occupying respectively a plurality of different frequency ranges 2-*fr*-1, 2-*fr*-2, 2-*fr*-3 (FIG. 1B), in which the second plurality of input signals 4-*in*-4, 4-*in*-5, 4-*in*-n are received wirelessly from a second client device 5-*cl*-2 respectively via a second plurality of antennas 3-*ant*-4, 3-*ant*-5, 3-*ant*-n. In step 1042, transporting the second plurality of upstream signals 2-*sig*-1", 2-*sig*-2", 2-*sig*-3" via a wire-based medium 2-WM to a base converter 1-BC operative to convert the second plurality of upstream signals 2-*sig*-1", 2-*sig*-2", 2-*sig*-3" respectively into a plurality of receive streams 1-*st*-1', 1-*st*-2', 1-*st*-3'. In step 1043, detecting, by a detector 3-D associated with the second plurality of mixers 3-*x*-4', 3-*x*-5', 3-*x*-n', a presence of the second plurality of input signals 4-*in*-4, 4-*in*-5, 4-*in*-n. In step 1044, preventing, by a controller 3-C associated with a first plurality of mixers 3-*x*-1', 3-*x*-2', 3-*x*-3', based on said detection, from shifting, by the first plurality of mixers 3-*x*-1', 3-*x*-2', 3-*x*-3', respectively, a first plurality of input signals 4-*in*-1, 4-*in*-2, 4-*in*-3, each occupying the single wireless frequency range 4-*wfr*, respectively into a first plurality of upstream signals 2-*sig*-1', 2-*sig*-2', 2-*sig*-3' occupying respectively the plurality of different frequency ranges 2-*fr*-1, 2-*fr*-2, 2-*fr*-3 (FIG. 1B), in which the first plurality of input signals 4-*in*-1, 4-*in*-2, 4-*in*-3 are received wirelessly from a first client device 5-*cl*-1 respectively via a first plurality of antennas 3-*ant*-1, 3-*ant*-2, 3-*ant*-3, thereby, as a result of said prevention, avoiding a presence of the first plurality of upstream signals 2-*sig*-1', 2-*sig*-2', 2-*sig*-3' in the wire-based medium 2-WM, which would otherwise interfere with the second plurality of upstream signals 2-*sig*-1", 2-*sig*-2", 2-*sig*-3" in the wire-based medium 2-WM, as both pluralities of upstream signals share the plurality of different frequency ranges 2-*fr*-1, 2-*fr*-2, 2-*fr*-3, thereby, as a result of said avoidance, allowing an access point 1-AP to successfully decode the plurality of receive streams 1-*st*-1', 1-*st*-2', 1-*st*-3'.

In one embodiment, the first client device 5-*cl*-1 and the second client device 5-*cl*-2 are Wi-Fi client devices operating in conjunction with a carrier-sense-multiple-access (CSMA) mechanism; and the first client device 5-*cl*-1 is located in a first location 4-*loc*-1 and the second client device 5-*cl*-2 is located in a second location 4-*loc*-2, such that as a result of the different locations 4-*loc*-1, 4-*loc*-2, the second plurality of upstream signals 2-*sig*-1", 2-*sig*-2", 2-*sig*-3" are not received by the first client device 5-*cl*-1, thereby adversely affecting the CSMA mechanism in the first client device 5-*cl*-1 and causing said reception of the first plurality of input signals 4-*in*-1, 4-*in*-2, 4-*in*-3 from the first client device.

In one embodiment, the CSMA mechanism is associated with a wireless communication standard in unlicensed band, such as IEEE 802.11, in which the upstream signals 2-*sig*-1", 2-*sig*-2", 2-*sig*-3" that are not received by the first client device 5-*cl*-1 are associated with the second client device 5-*cl*-2 being a hidden station relative to the first client device.

In one embodiment, the wire-based medium 2-WM is a coaxial cable deployed in-house; and the first location 4-*loc*-1 is a first room in-house, and the second location 4-*loc*-2 is a second room in-house, thereby causing said second client device 5-*cl*-2 being a hidden station relative to the first client device 4-*loc*-2.

One embodiment is a system 1-AP, 1-BC, 2-WM, 3-*x*-1', 3-*x*-2', 3-*x*-3', 3-*x*-4', 3-*x*-5', 3-*x*-n', 3-*ant*-1, 3-*ant*-2, 3-*ant*-3, 3-*ant*-4, 3-*ant*-5, 3-*ant*-n, 3-C, 3-D, configured to prevent a first wireless transmission from interfering with a second wireless transmission both transported over a wire-based medium, for example as illustrated in FIG. 3B.

Figure 4A:
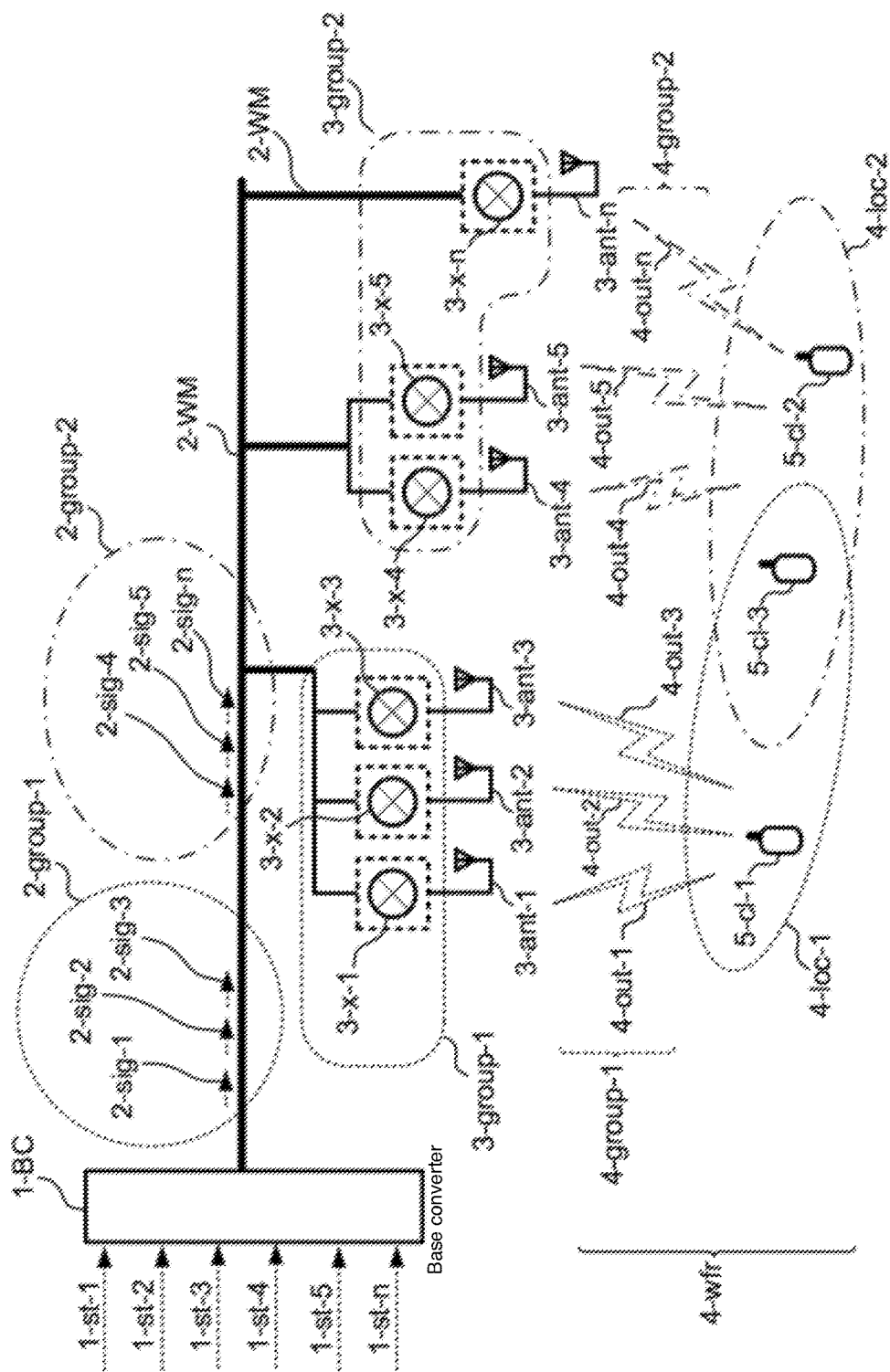
FIG. 4A illustrates one embodiment of a system operative to cover wirelessly multiple spatial locations via a wire-based medium using grouping of streams associated with spatial multiplexing.
Figure 4B:
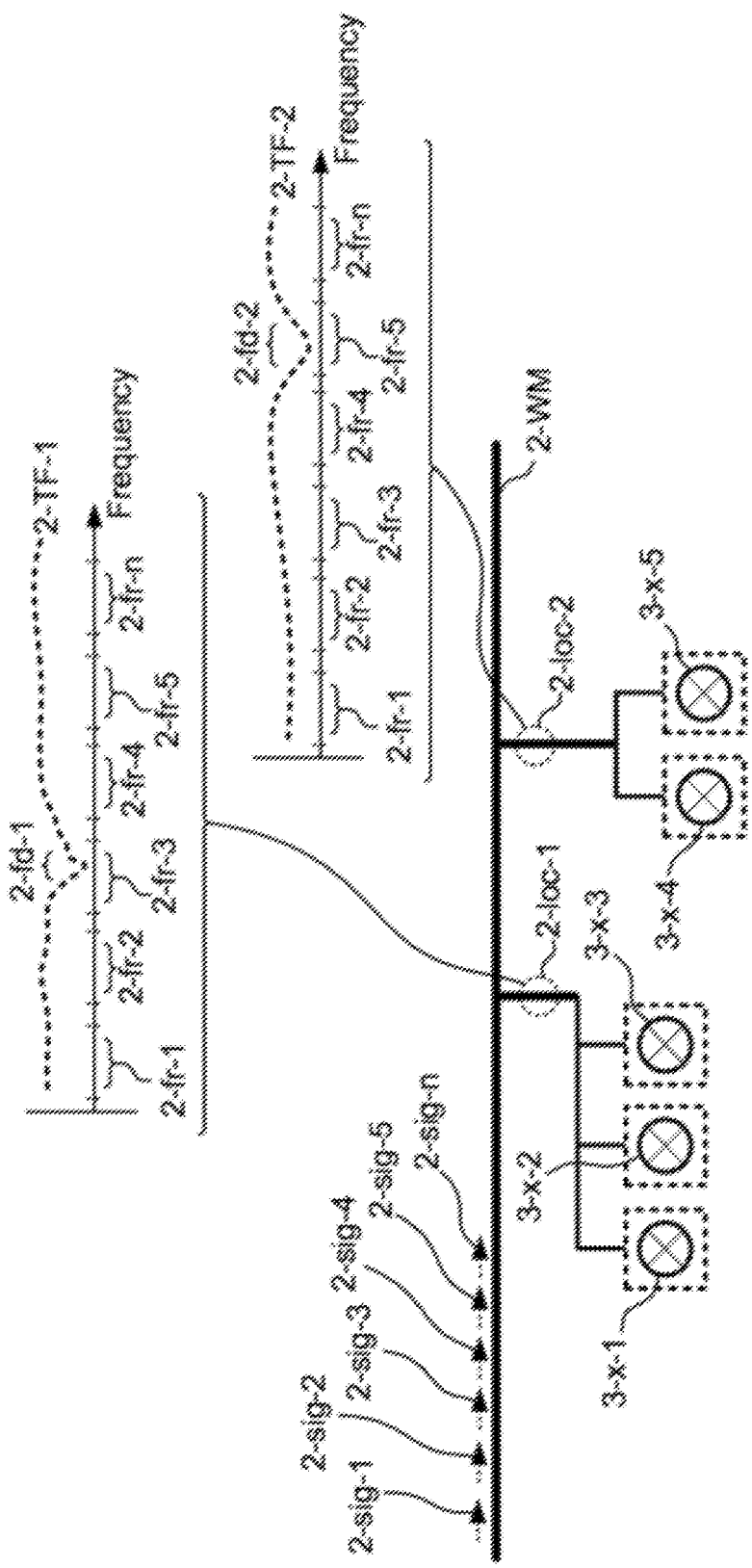
FIG. 4B illustrates one embodiment of a system operative to resolve a sub-optimal communication condition.
Figure 4C:
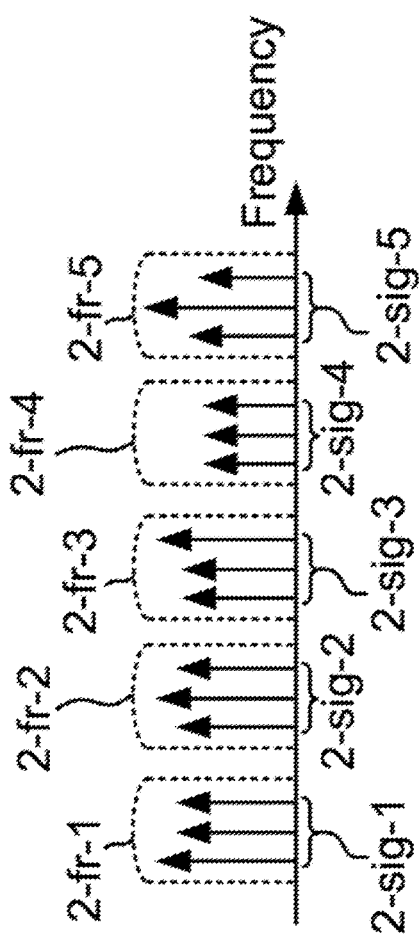
FIG. 4C illustrates one embodiment of frequency assignments for signals prior to resolving the sub-optimal communication condition.
Figure 10:
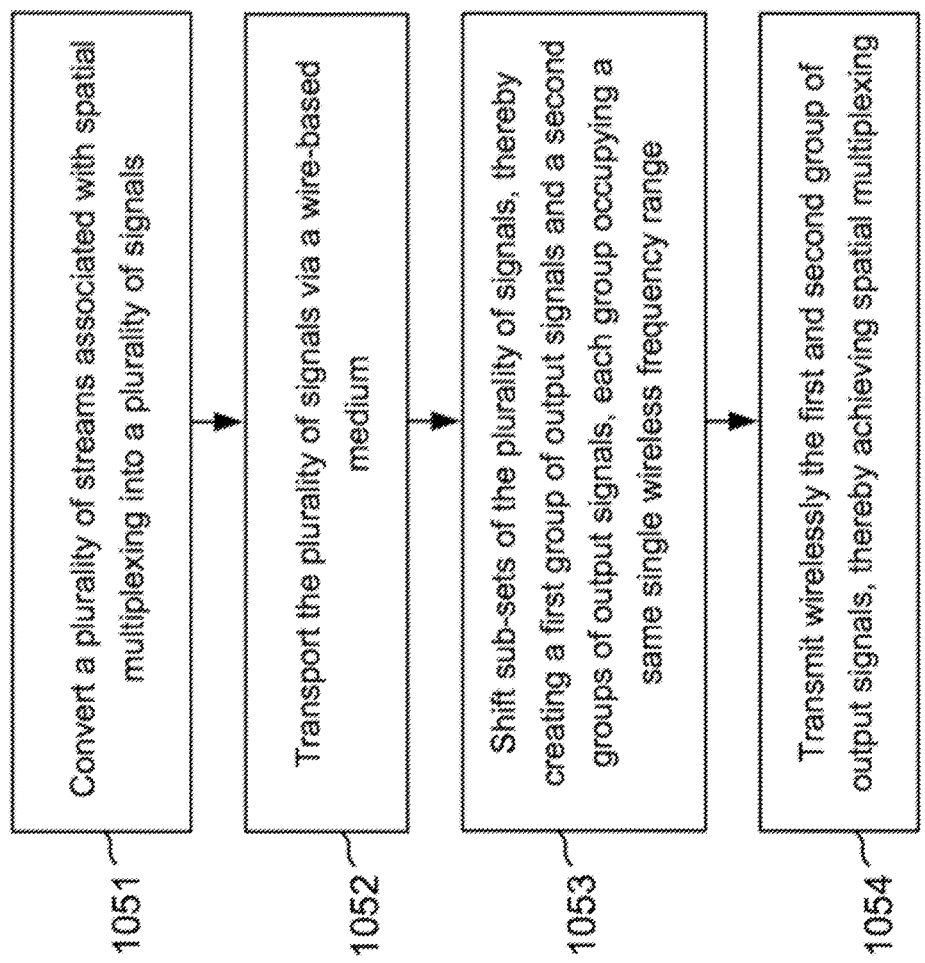
FIG. 10 illustrates one embodiment of a method for covering wirelessly multiple spatial locations via a wire-based medium using grouping of streams associated with spatial multiplexing.

The following paragraphs are associated with FIG. 4A, FIG. 10.

FIG. 10 illustrates one embodiment of a method for covering wirelessly multiple spatial locations via a wire-based medium using grouping of streams associated with spatial multiplexing. In step 1051, converting, by a base converter 1-BC, a plurality of streams 1-*st*-1, 1-*st*-2, 1-*st*-3, 1-*st*-4, 1-*st*-5, 1-*st*-n respectively into a plurality of signals 2-*sig*-1, 2-*sig*-2, 2-*sig*-3, 2-*sig*-4, 2-*sig*-5, 2-*sig*-n occupying respectively a plurality of different frequency ranges 2-*fr*-1, 2-*fr*-2, 2-*fr*-3, 2-*fr*-4, 2-*fr*-5, 2-*fr*-n, in which the plurality of streams are associated with spatial multiplexing. In step 1052, transporting, by the base converter 1-BC, a first sub-set 2-*sig*-1, 2-*sig*-2, 2-*sig*-3 (2-*group*-1) of the plurality of signals via a wire-based medium 2-WM respectively to a first group of mixers 3-*x*-1, 3-*x*-2, 3-*x*-3 (3-*group*-1), and a second sub-set 2-*sig*-4, 2-*sig*-5, 2-*sig*-*n* (2-*group*-2) of the plurality of signals via the wire-based medium 2-WM respectively to a second group of mixers 3-*x*-4, 3-*x*-5, 3-*x*-*n* (3-*group*-2). In step 1053, shifting, by each of the first group of mixers 3-*x*-1, 3-*x*-2, 3-*x*-3 (3-*group*-1), the respective one of the signals from the respective frequency range to a single wireless frequency range 4-*wfr* (i.e., 3-*x*-1 is shifting 2-*sig*-1 from 2-*fr*-1 to 4-*wfr*, 3-*x*-2 is shifting 2-*sig*-2 from 2-*fr*-2 to 4-*wfr*, and 3-*x*-3 is shifting 2-*sig*-3 from 2-*fr*-3 to 4-*wfr*), thereby creating, respectively, a first group of output signals 4-*out*-1, 4-*out*-2, 4-*out*-3 (4-*group*-1) each occupying the single wireless frequency range 4-*wfr* and corresponding to the respective stream (i.e. 4-*out*-1 corresponding to 1-*st*-1, 4-*out*-2 corresponding to 1-*st*-2, and 4-*out*-3 corresponding to 1-*st*-3), and shifting, by each of the second group of mixers 3-*x*-4, 3-*x*-5, 3-*x*-*n* (3-*group*-2), the respective one of the signals from the respective frequency range to the single wireless frequency range 4-*wfr* (i.e., 3-*x*-4 is shifting 2-*sig*-4 from 4-*fr*-1 to 4-*wfr*, 3-*x*-5 is shifting 2-*sig*-5 from 2-*fr*-5 to 4-*wfr*, and 3-*x*-*n* is shifting 2-*sig*-*n* from 2-*fr*-*n* to 4-*wfr*), thereby creating, respectively, a second group of output signals 4-*out*-4, 4-*out*-5, 4-*out*-*n* (4-*group*-2) each occupying the single wireless frequency range 4-*wfr* and corresponding to the respective stream (i.e. 4-*out*-4 corresponding to 1-*st*-5, 4-*out*-5 corresponding to 1-*st*-5, and 4-*out*-*n* corresponding to 1-*st*-*n*). In step 1054, transmitting wirelessly the first group of output signals 4-*out*-1, 4-*out*-2, 4-*out*-3 (4-*group*-1) via a first group of antennas 3-*ant*-1, 3-*ant*-2, 3-*ant*-3 thereby achieving spatial multiplexing in conjunction with the first group of output signals 4-*group*-1 all occupying the single wireless frequency range 4-*wfr*, and transmitting wirelessly the second group of output signals 4-*out*-4, 4-*out*-5, 4-*out*-*n* (4-*group*-2) via a second group of antennas 3-*ant*-4, 3-*ant*-5, 3-*ant*-*n* thereby achieving spatial multiplexing in conjunction with the second group of output signals 4-*group*-2 all occupying the single wireless frequency range 4-*wfr*, wherein the first group of output signals 4-*group*-1 transmitted wirelessly are associated with a first spatial location 4-*loc*-1 and the second group of output signals 4-*group*-2 transmitted wirelessly are associated with a second spatial location 4-*loc*-2.

In one embodiment, a first client device 5-*cl*-1 associated with the first spatial location 4-*loc*-1 decodes at least a first number of data streams associated with the spatial multiplexing in conjunction with the first group of output signals 4-*group*-1; and a second client device 5-*cl*-3 associated with both the first spatial location 4-*loc*-1 and the second spatial location 4-*loc*-2 decodes a second number of data streams associated with the spatial multiplexing in conjunction with the first group of output signals 4-*group*-1 and the second group of output signals 4-*group*-2, in which the second number is greater than the first number, thereby facilitating higher data rates for the second client device 5-*cl*-3 as compared to the first client device 5-*cl*-1.

In one embodiment, a first client device 5-*cl*-1 associated with the first spatial location 4-*loc*-1 decodes data streams associated with the spatial multiplexing in conjunction with the first group of output signals 4-*group*-1; and a second client device 5-*cl*-2 associated with the second spatial location 4-*loc*-2 decodes data streams associated with the spatial multiplexing in conjunction with the second group of output signals 4-*group*-2, for example as illustrated in FIG. 4A.

The following paragraphs are associated with FIG. 4A, FIG. 4B, FIG. 4C, FIG. 4D.

Figure 4D:
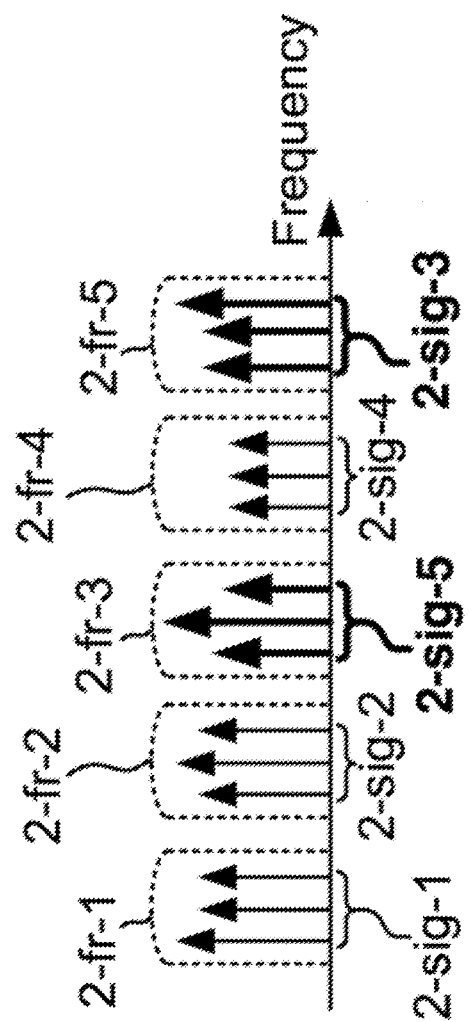
FIG. 4D illustrates one embodiment of frequency assignments for signals after resolving the sub-optimal communication condition.

In one embodiment, the wire-based medium 2-WM has a transfer function 2-TF-1, 2-TF-2, in conjunction with the plurality of signals 2-*sig*-1, 2-*sig*-2, 2-*sig*-3, 2-*sig*-4, 2-*sig*-5, 2-*sig*-*n* and the respective plurality of different frequency ranges 2-*fr*-1, 2-*fr*-2, 2-*fr*-3, 2-*fr*-4, 2-*fr*-5, 2-*fr*-*n*, that varies along different locations along the wire-based medium 2-WM, such that the wire-based medium has a first transfer function 2-TF-1 in conjunction with a first location 2-*loc*-1 along the wire-based medium, and a second transfer function 2-TF-2 in conjunction with a second location 2-*loc*-2 along the wire-based medium; the first location 2-*loc*-1 along the wire-based medium 2-WM is associated with the first group of mixers 3-*x*-1, 3-*x*-2, 3-*x*-3 (3-*group*-1), and the second location 2-*loc*-2 along the wire-based medium is associated with the second group of mixers 3-*x*-4, 3-*x*-5, 3-*x*-*n* (3-*group*-2); and the first transfer function 2-TF-1 has a first fading 2-*fd*-1 located within the frequency range 2-*fr*-3 associated with one of the signals 2-*sig*-3 transported to the first group of mixers 3-*x*-1, 3-*x*-2, 3-*x*-3 (3-*group*-1), such as to adversely affect the signal 2-*sig*-3 and the respective output signal 4-*out*-3, in which the method for covering wirelessly multiple spatial locations via a wire-based medium using grouping of streams associated with spatial multiplexing further comprises:

detecting, by an access point 1-AP (not illustrated in FIG. 4A) generating said plurality of streams 1-*st*-1, 1-*st*-2, 1-*st*-3, 1-*st*-4, 1-*st*-5, 1-*st*-*n*, a sub-optimal communication condition in conjunction with a first client device 5-*cl*-1 receiving the output signal 4-*out*-3 affected by the first fading 2-*fd*-1; and changing, by the access point 1-AP, in conjunction with the base converter 1-BC and the appropriate mixer 3-*x*-3 in the first group of mixers 3-*group*-1, the frequency range 2-*fr*-3 associated with the signal 2-*sig*-3 adversely affected by the first fading 2-*fd*-1, to a different frequency range 2-*fr*-5, such that the signal 2-*sig*-3 adversely affected by the first fading 2-*fd*-1 is now associated with the different frequency range 2-*fr*-5 (this new association is depicted in FIG. 4D), and is therefore no longer adversely affected by the first fading 2-*fd*-1, thereby resolving the sub-optimal communication condition in conjunction with a first client device 5-*cl*-1.

One embodiment further comprises: using the frequency range 2-*fr*-3 previously associated with the signal 2-*sig*-3 that was adversely affected by the first fading 2-*fd*-1 for the transporting of one of the signals 2-*sig*-5 to the second group of mixers 3-*group*-2, in which the frequency range 2-*fr*-3 previously associated with the signal 2-*sig*-3 that was adversely affected by the first fading 2-*fd*-1 is clear from fading in conjunction with the second transfer function 2-TF-2 associated with the second location 2-*loc*-2 along the wire-based medium and associated with the second group of mixers 3-*group*-2.

One embodiment is a system 1-BC, 2-WM, 3-*x*-1, 3-*x*-2, 3-*x*-3, 3-*x*-4, 3-*x*-5, 3-*x*-*n*, 3-*ant*-1, 3-*ant*-2, 3-*ant*-3, 3-*ant*-4, 3-*ant*-5, 3-*ant*-*n*, configured to cover wirelessly multiple spatial locations via a wire-based medium using grouping of streams associated with spatial multiplexing, for example as illustrated in FIG. 4A.

Figure 5:
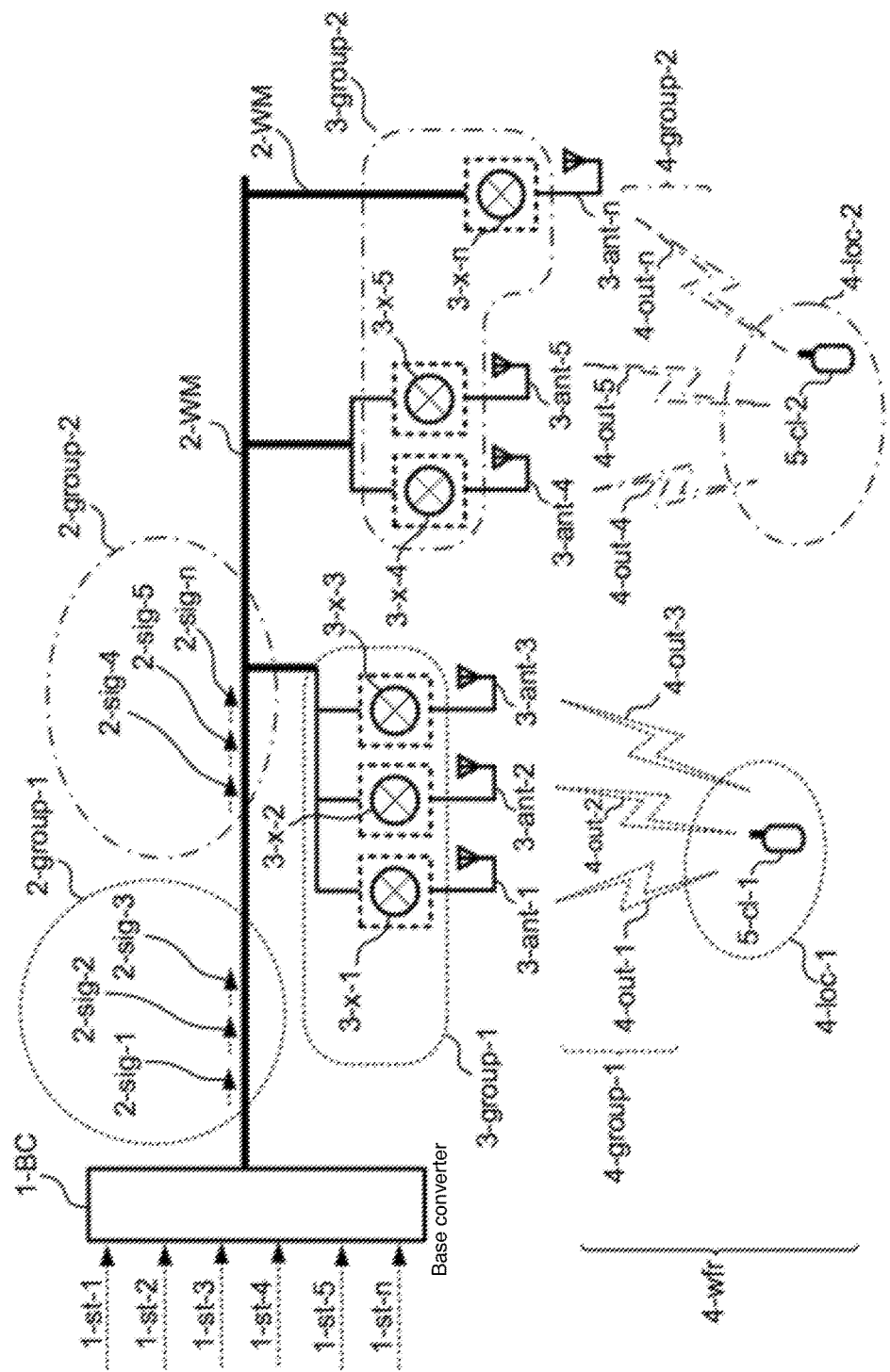
FIG. 5 illustrates one embodiment of a system operative to achieve spatial-division-multiple-access via a wire-based medium by grouping of streams in conjunction with a plurality of spatial locations.
Figure 11:
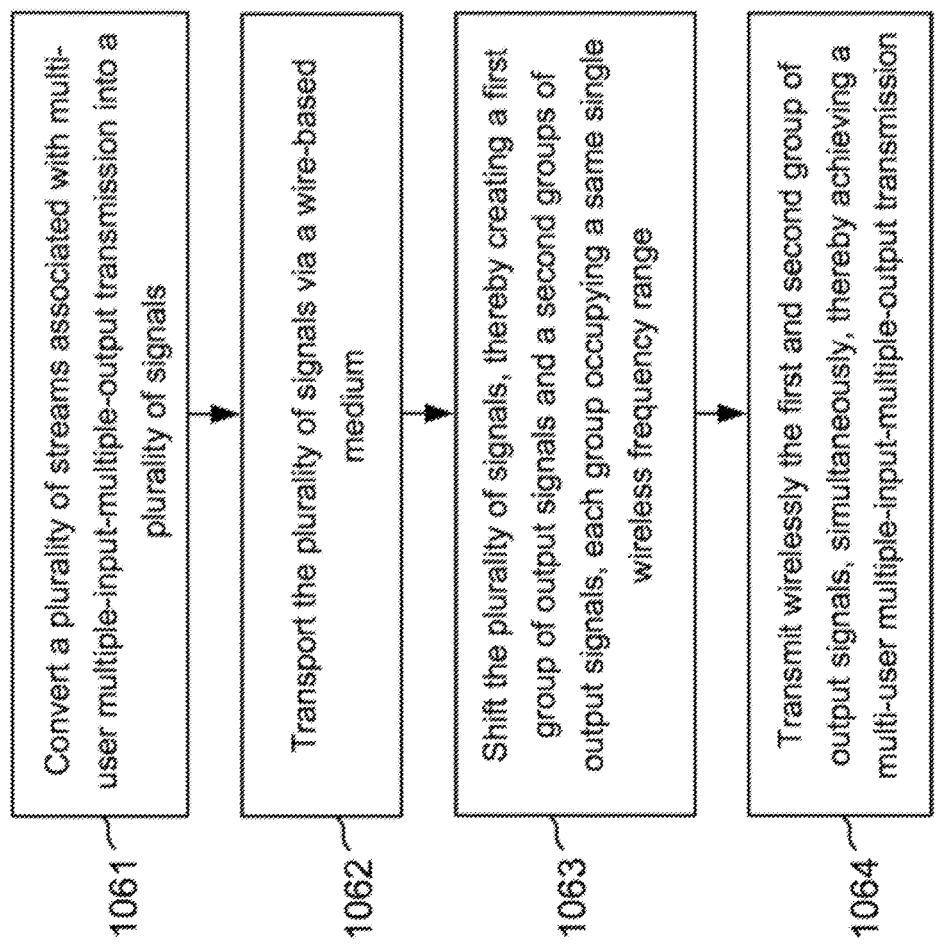
FIG. 11 illustrates one embodiment of a method for achieving spatial-division-multiple-access via a wire-based medium by grouping of streams in conjunction with a plurality of spatial locations.

The following paragraphs are associated with FIG. 5, FIG. 11.

FIG. 11 illustrates one embodiment of a method for achieving spatial-division-multiple-access via a wire-based medium by grouping of streams in conjunction with a plurality of spatial locations. In step 1061, converting, by a base converter 1-BC, a plurality of streams 1-*st*-1, 1-*st*-2, 1-*st*-3, 1-*st*-4, 1-*st*-5, 1-*st*-*n* respectively into a plurality of signals 2-*sig*-1, 2-*sig*-2, 2-*sig*-3, 2-*sig*-4, 2-*sig*-5, 2-*sig*-*n* occupying respectively a plurality of different frequency ranges 2-*fr*-1, 2-*fr*-2, 2-*fr*-3, 2-*fr*-4, 2-*fr*-5, 2-*fr*-n, in which the plurality of streams are associated with a multi-user multiple-input-multiple-output transmission. In step 1062, transporting, by the base converter 1-BC, a first sub-set 2-*sig*-1, 2-*sig*-2, 2-*sig*-3 (2-*gourp*-1) of the plurality of signals via a wire-based medium 2-WM respectively to a first group of mixers 3-*x*-1, 3-*x*-2, 3-*x*-3 (3-*group*-1), and a second sub-set 2-*sig*-4, 2-*sig*-5, 2-*sig*-n (2-*group*-2) of the plurality of signals via the wire-based medium 2-WM respectively to a second group of mixers 3-*x*-4, 3-*x*-5, 3-*x*-n (3-*group*-2). In step 1063, shifting, by each of the first group of mixers 3-*x*-1, 3-*x*-2, 3-*x*-3 (3-*group*-1), the respective one of the signals from the respective frequency range to a single wireless frequency range 4-*wfr* (i.e., 3-*x*-1 is shifting 2-*sig*-1 from 2-*fr*-1 to 4-*wfr*, 3-*x*-2 is shifting 2-*sig*-2 from 2-*fr*-2 to 4-*wfr*, and 3-*x*-3 is shifting 2-*sig*-3 from 2-*fr*-3 to 4-*wfr*), thereby creating, respectively, a first group of output signals 4-*out*-1, 4-*out*-2, 4-*out*-3 (4-*group*-1) each occupying the single wireless frequency range 4-*wfr* and corresponding to the respective stream (i.e. 4-*out*-1 corresponding to 1-*st*-1, 4-*out*-2 corresponding to 1-*st*-2, and 4-*out*-3 corresponding to 1-*st*-3), and shifting, by each of the second group of mixers 3-*x*-4, 3-*x*-5, 3-*x*-n (3-*group*-2), the respective one of the signals from the respective frequency range to the single wireless frequency range 4-*wfr* (i.e., 3-*x*-4 is shifting 2-*sig*-4 from 2-*fr*-4 to 4-*wfr*, 3-*x*-5 is shifting 2-*sig*-5 from 2-*fr*-5 to 4-*wfr*, and 3-*x*-n is shifting 2-*sig*-n from 2-*fr*-n to 4-*wfr*), thereby creating, respectively, a second group of output signals 4-*out*-4, 4-*out*-5, 4-*out*-n (4-*group*-2) each occupying the single wireless frequency range 4-*wfr* and corresponding to the respective stream (i.e. 4-*out*-4 corresponding to 1-*st*-5, 4-*out*-5 corresponding to 1-*st*-5, and 4-*out*-n corresponding to 1-*st*-n). In step 1064, transmitting, as a first transmission, wirelessly the first group of output signals 4-*group*-1 via a first group of antennas 3-*ant*-1, 3-*ant*-2, 3-*ant*-3 thereby achieving spatial multiplexing in conjunction with the first group of output signals 4-*group*-1 all occupying the single wireless frequency range 4-*wfr*, and transmitting, as a second transmission, wirelessly the second group of output signals 4-*group*-2 via a second group of antennas 3-*ant*-4, 3-*ant*-5, 3-*ant*-n thereby achieving spatial multiplexing in conjunction with the second group 4-*group*-2 of output signals all occupying the single wireless frequency range 4-*wfr*, and thereby facilitating a multi-user multiple-input-multiple-output transmission, in which the two transmissions are done simultaneously or concurrently over the single wireless frequency range 4-*wfr*, such that a first client device 5-*cl*-1 receives the first transmission simultaneously or substantially simultaneously to a second client device 5-*cl*-2 receiving the second transmission.

In one embodiment, the first group of output signals 4-*group*-1 transmitted wirelessly is associated with a first spatial location 4-*loc*-1 also associated with the first client 5-*cl*-1, and the second group of output signals 4-*group*-2 transmitted wirelessly is associated with a second spatial location 4-*loc*-2 also associated with the second client device 5-*cl*-2, such that the first group of output signals 4-*group*-1 is received in the second spatial location 4-*loc*-2 by the second client device 5-*cl*-2 at a power level that is at least 10 (ten) decibel below a power level at which the second group of output signals 4-*group*-2 is received in the second spatial location 4-*loc*-2 by the second client device 5-*cl*-2; and the second group of output signals 4-*grou*-2 is received in the first spatial location 4-*loc*-1 by the first client device 5-*cl*-1 at a power level that is at least 10 (ten) decibel below a power level at which the first group of output signals 4-*group*-1 is received in the first spatial location 4-*loc*-1 by the first client device 5-*cl*-1, thereby further facilitating the multi-user multiple-input-multiple-output transmission without a need to perform a sounding procedure.

In one embodiment, the multi-user multiple-input-multiple-output transmission is achieved in conjunction with a sounding procedure done with the first client device 5-*cl*-1 and the second client device 5-*cl*-2, such that the second transmission does not interfere with the first transmission and vice versa.

In one embodiment, the multi-user multiple-input-multiple-output transmission is associated with IEEE 802.11ac.

One embodiment is a system 1-BC, 2-WM, 3-*x*-1, 3-*x*-2, 3-*x*-3, 3-*x*-4, 3-*x*-5, 3-*x*-n, 3-*ant*-1, 3-*ant*-2, 3-*ant*-3, 3-*ant*-4, 3-*ant*-5, 3-*ant*-n, configured to achieve spatial-division-multiple-access via a wire-based medium by grouping of streams in conjunction with a plurality of spatial locations, for example as illustrated in FIG. 5.

Figure 6A:
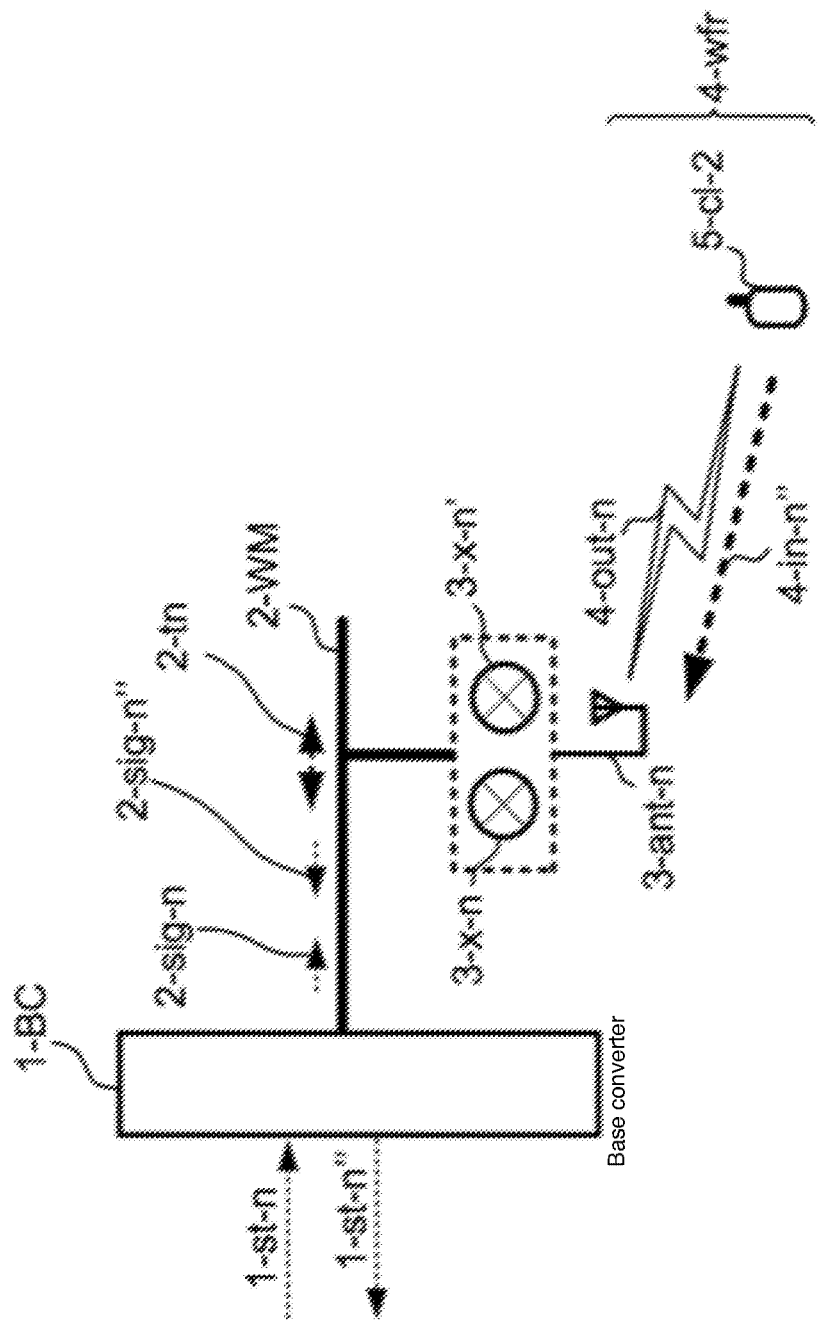
FIG. 6A illustrates one embodiment of a system operative to use wireless frame aggregation to mitigate wire-based interferences.
Figure 6B:
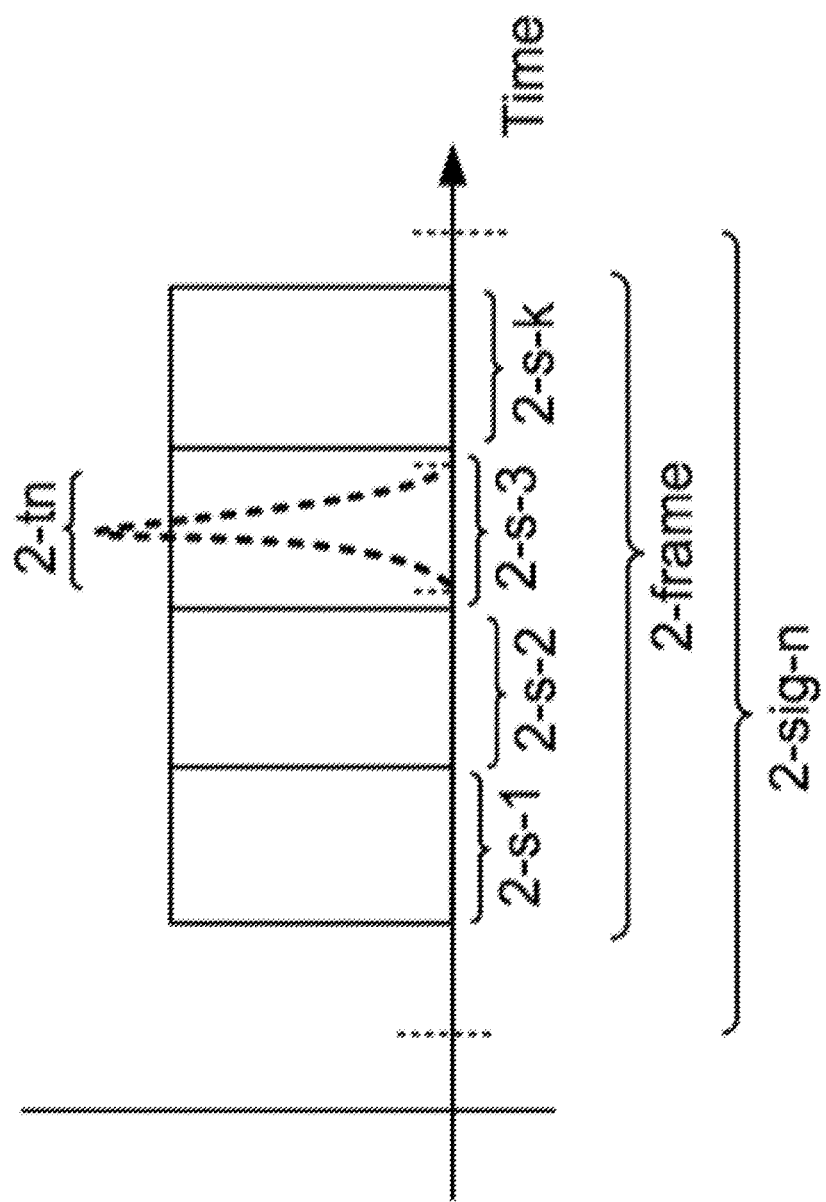
FIG. 6B illustrates one embodiment of a transient interference appearing in an aggregated data frame and in conjunction with the system operative to use wireless frame aggregation to mitigate wire-based interferences.
Figure 12:
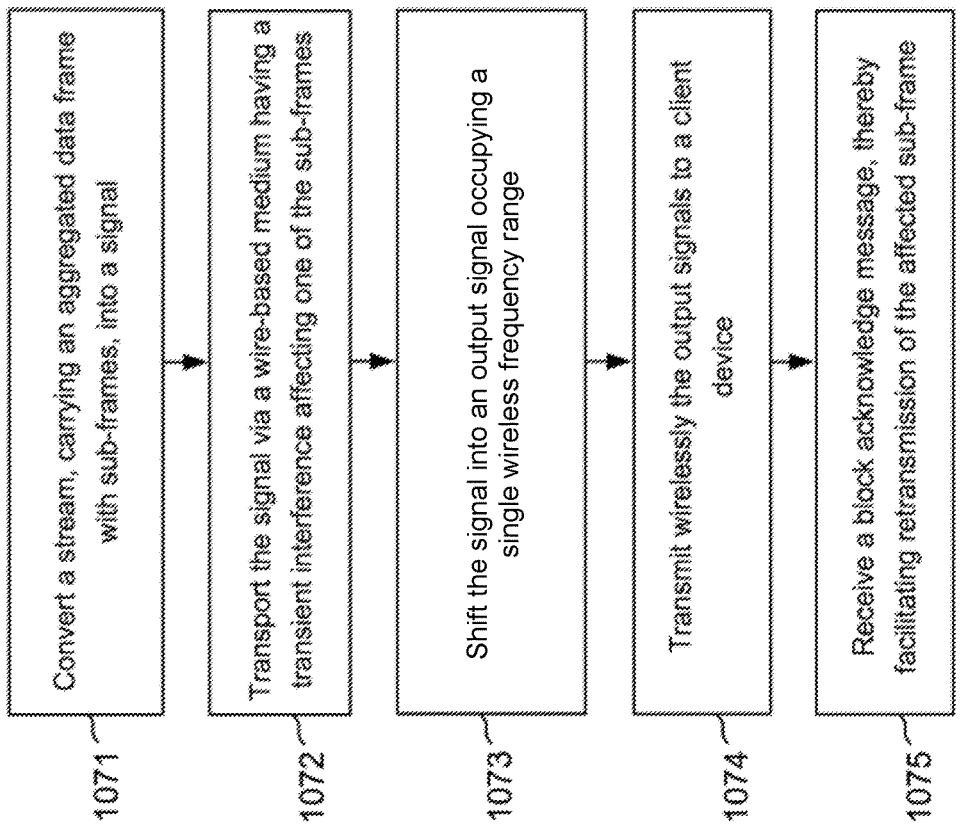
FIG. 12 illustrates one embodiment of a method for using wireless frame aggregation to mitigate wire-based interferences.

The following paragraphs are associated with FIG. 6A, FIG. 6B, FIG. 12.

FIG. 12 illustrates one embodiment of a method for using wireless frame aggregation to mitigate wire-based interferences. In step 1071, converting, by a base converter 1-BC, at least one stream 1-*st*-n respectively into at least one signal 2-*sig*-n occupying respectively at least one frequency range 2-*fr*-n, in which the stream is conveying an aggregated data frame 2-*frame* comprising a plurality of sub-frames 2-*s*-1, 2-*s*-2, 2-*s*-3, 2-*s*-k. In step 1072, transporting, by the base converter 1-BC, the signal 2-*sig*-n via a wire-based medium 2-WM respectively to at least one mixer 3-*x*-n, in which a transient interference 2-*tn* associated with the wire-based medium 2-WM affects at least one sub-frame 2-*s*-3 in the aggregated data frame 2-*frame* conveyed by the signal 2-*sig*-n, but not all of the sub-frames in the aggregated data frame. In step 1073, shifting, by the mixer 3-*x*-n, the signal 2-*sig*-n from the respective frequency 2-*fr*-n range to a single wireless frequency range 4-*wfr*, thereby creating, respectively, at least one output signal 4-*out*-n occupying the single wireless frequency range 4-*wfr* and corresponding to the respective stream 1-*st*-n, in which the sub-frame 2-*s*-3 affected by the transient interference 2-*tn* is present in the output signal 4-*out*-n. In step 1074, transmitting wirelessly the output signal 4-*out*-n, respectively via at least one antenna 3-*ant*-n to a client device 5-*cl*-2. In step 1075, receiving 1-*st*-n", 2-*sig*-n", from the client device 5-*cl*-2, a block acknowledge message 4-*in*-n" comprising an indication of which of the sub-frames 2-*s*-3 were affected by the transient interference 2-*tn*, thereby facilitating retransmission of the affected sub-frames 2-*s*-3.

In one embodiment, the wire-based medium 2-WM is a coaxial cable deployed in-house.

In one embodiment, the frequency 2-*fr*-1 is located below 1.5 GHz, at a frequency zone that is, at least momentarily, not occupied by in-house coaxial signals such as DOCSIS signals, MoCA signals, and cable TV signals.

In one embodiment, the transient interference 2-*tn* is associated with ingress noise occurring in conjunction with the coaxial cable deployed in-house.

In one embodiment, the frame aggregation and block acknowledge are associated with IEEE 802.11n or IEEE 802.11ac.

One embodiment is a system 1-AP, 1-BC, 2-WM, 3-*x*-n, 3-*x*-n', 3-*ant*-n, configured to use wireless frame aggregation to mitigate wire-based interferences.

The following paragraphs are associated with FIG. 1A, FIG. 1B, FIG. 1C, FIG. 13.

Figure 13:
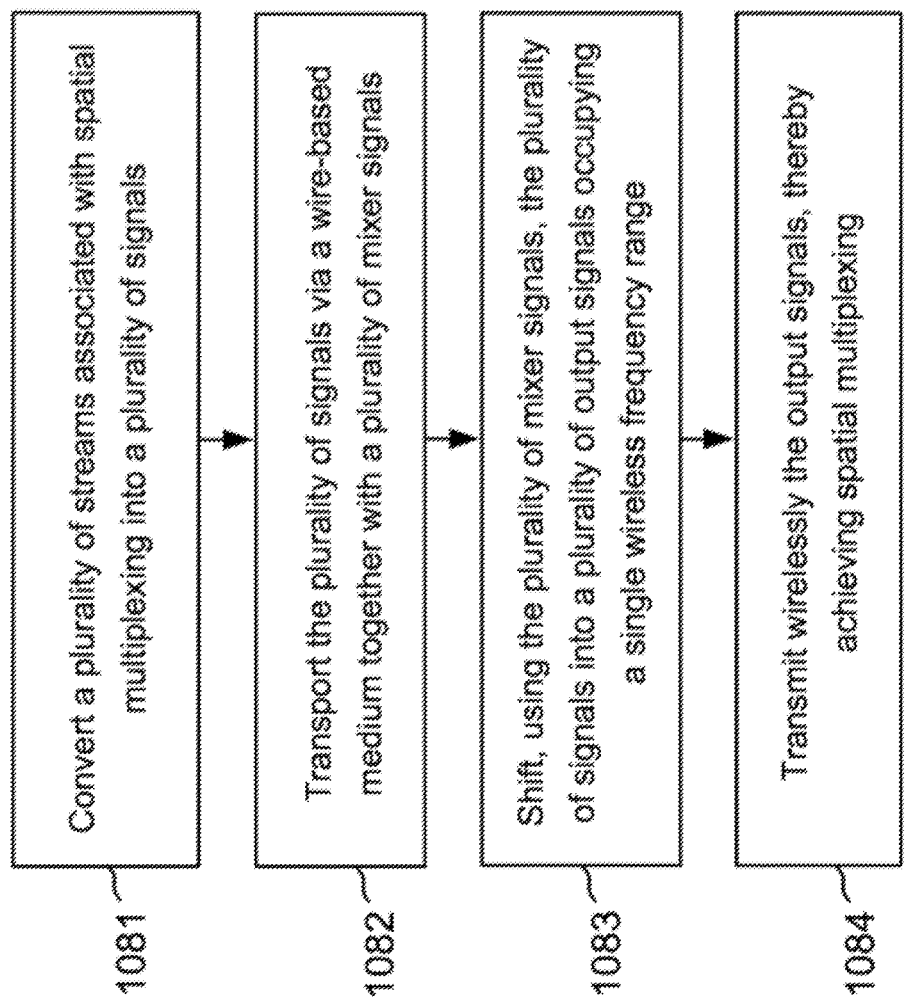
FIG. 13 illustrates one embodiment of a method for transporting a plurality of streams associated with spatial multiplexing over a wire-based medium together with corresponding mixer signals.

FIG. 13 illustrates one embodiment of a method for transporting a plurality of streams associated with spatial multiplexing over a wire-based medium together with corresponding mixer signals. In step 1081, converting, by a base converter 1-BC, a plurality of streams 1-st-1, 1-st-2, 1-st-3, 1-st-4, 1-st-5, 1-st-n respectively into a plurality of signals 2-sig-1, 2-sig-2, 2-sig-3, 2-sig-4, 2-sig-5, 2-sig-n occupying respectively a plurality of different frequency ranges 2-fr-1, 2-fr-2, 2-fr-3, 2-fr-4, 2-fr-5, 2-fr-n, in which the plurality of streams are associated with spatial multiplexing. In step 1082, transporting, by the base converter 1-BC, the plurality of signals 2-sig-1, 2-sig-2, 2-sig-3, 2-sig-4, 2-sig-5, 2-sig-n together with a plurality of mixer signals 2-clk-1, 2-clk-2, 2-clk-3, 2-clk-4, 2-clk-5, 2-clk-n (see FIG. 1C), associated respectively with the plurality of signals, via a wire-based medium 2-WM respectively to a plurality of mixers 3-x-1, 3-x-2, 3-x-3, 3-x-4, 3-x-5, 3-x-n. In step 1083, shifting, by each of the of mixers 3-x-1, 3-x-2, 3-x-3, 3-x-4, 3-x-5, 3-x-n, using the respective mixer signal 2-clk-1, 2-clk-2, 2-clk-3, 2-clk-4, 2-clk-5, 2-clk-n, the respective one of the signals from the respective frequency range to a single wireless frequency range 4-wfr (i.e., 3-x-1 is shifting 2-sig-1 from 2-fr-1 to 4-wfr using 2-clk-1 as an input clock to 3-x-1, 3-x-2 is shifting 2-sig-2 from 2-fr-2 to 4-wfr using 2-clk-2 as an input clock to 3-x-2, etc.), thereby creating, respectively, a plurality of output signals 4-out-1, 4-out-2, 4-out-3, 4-out4, 4-out-5, 4-out-n each occupying the single wireless frequency range 4-wfr and corresponding to the respective stream. In step 1084, transmitting wirelessly the plurality of output signals 4-out-1, 4-out-2, 4-out-3, 4-out4, 4-out-5, 4-out-n via a plurality of antennas 3-ant-1, 3-ant-2, 3-ant-3, 3-ant-4, 3-ant-5, 3-ant-n, thereby achieving spatial multiplexing in conjunction with the plurality of output signals 4-out-1, 4-out-2, 4-out-3, 4-out4, 4-out-5, 4-out-n all occupying the single wireless frequency range 4-wfr.

In one embodiment, the plurality of signals 2-sig-1, 2-sig-2, 2-sig-3, 2-sig-4, 2-sig-5, 2-sig-n and the plurality of output signals 4-out-1, 4-out-2, 4-out-3, 4-out4, 4-out-5, 4-out-n are OFDM or OFDMA signals associated with a standard selected from a group consisting of (i) Wi-Fi, (ii) WiMAX, and (iii) LTE.

In one embodiment, the wire-based medium 2-WM is a coaxial cable deployed in-house.

In one embodiment, the plurality of different frequency ranges 2-fr-1, 2-fr-2, 2-fr-3, 2-fr-4, 2-fr-5, 2-fr-n are located below 1.5 GHz, at frequency zones that are, at least momentarily, not occupied by in-house coaxial signals such as DOCSIS signals, MoCA signals, and cable TV signals.

In one embodiment, the wire-based medium 2-WM is selected from a group consisting of: (i) a coaxial cable, (ii) a twisted-pair cable, (iii) category-5 cable, and (iv) any cable capable of facilitating propagation of electromagnetic signals.

One embodiment is a system 1-BC, 2-WM, 3-x-1, 3-x-2, 3-x-3, 3-x-4, 3-x-5, 3-x-n, 3-ant-1, 3-ant-2, 3-ant-3, 3-ant-4, 3-ant-5, 3-ant-n, configured to transport a plurality of streams associated with spatial multiplexing over a wire-based medium together with corresponding mixer signals.

The present invention should not be considered limited to the particular embodiments described above, but rather should be understood to cover all aspects of the invention as fairly set out in the present claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. A method for using spatial multiplexing to mitigate wire-based interferences, comprising:
converting, by a base converter, a plurality of input streams into a respective plurality of signals occupying different frequency ranges, in which the plurality of input streams are associated with spatial multiplexing;
transporting, by the base converter, the plurality of input signals via a wire-based medium respectively to a plurality of mixers, in which an interference associated with the wire-based medium affects at least one of the signals in one of the frequency ranges, but not all of the signals in all of the frequency ranges;
shifting, by each of the plurality of mixers, the respective one of the signals from the respective frequency range to a single wireless frequency range, thereby creating, respectively, a plurality of output signals, each of the plurality of output signals occupying the single wireless frequency range and corresponding to the respective one of the plurality of input streams; and
transmitting wirelessly the plurality of output signals respectively via a plurality of antennas thereby achieving spatial multiplexing in conjunction with the plurality of output signals all occupying the single wireless frequency range,
wherein at least one of the plurality of output signals transmitted wirelessly is affected by the interference, but not all of the output signals are affected by the interference, thereby facilitating successful decoding of N data streams associated with the spatial multiplexing.

2. The method of claim 1, further comprising:
generating, by an access point, the plurality of input streams, out of the N data streams, using a spatial expansion element, wherein:
the N data streams are mapped into the plurality of input streams comprising M input streams, such that M is greater than or equal to N, and the interference causes the access point to decrease N relative to M to reduce or overcome the interference.

3. The method of claim 2, wherein:
the access point is at least one of (1) a Wi-Fi access point supporting at least partly a standard associated with IEEE 802.11, including IEEE 802.11n or IEEE 802.11ac, or (2) a Long-Term Evolution (LTE) access point or an LTE base-station supporting at least partly a standard associated with LTE,
in which the spatial multiplexing in conjunction with plurality of streams is part of at least one of the standard associated with IEEE 802.11 or the standard associated with LTE.

4. The method of claim 3, wherein the plurality of output signals are orthogonal frequency-division multiplexing (OFDM) signals, thereby further overcoming the interference in conjunction with the spatial multiplexing.

5. The method of claim 1, wherein said interference is associated with noise on the wire-based medium.

6. The method of claim 1, wherein said interference is associated with signal reflections associated with the wire-based medium, in which the signal reflections adversely affect a transfer function associated with the wire-based medium in one of the frequency ranges associated with one of the signals.

7. The method of claim 1, wherein the wire-based medium is selected from a group consisting of: (i) a coaxial cable, (ii) a twisted-pair cable, (iii) category-5 cable, and (iv) any cable capable of facilitating propagation of electromagnetic signals.

8. The method of claim 1, wherein:
the wire-based medium comprises a coaxial cable deployed in a building;
the plurality of mixers are associated respectively with a plurality of radio-frequency chains operative together to facilitate said shifting of the plurality of input signals to the single wireless frequency range; and
the plurality of radio-frequency chains are housed in at least list a single converter placed in a room in the building, or are housed respectively in a plurality of converters placed in a plurality of rooms in the building.

9. The method of claim 8, wherein the interference is associated with signals injected into the coaxial cable by an electronic appliance.

10. The method of claim 8, wherein the interference is associated with reflections produced by stubs of the coaxial cable.

11. The method of claim 8, wherein the plurality of different frequency ranges are below 1.5 GHz, and are at frequency zones that are, at least momentarily, not occupied by coaxial signals such as Data Over Cable Service Interface Specification (DOCSIS) signals, Multimedia over Coax Alliance (MoCA) signals, and cable TV signals at the building.

12. The method of claim 11, wherein:
the plurality of input streams are input to the base converter in a radio frequency form at frequency bands above 1.5 GHz, including but not limited to a 1.8 GHz band, a 1.9 GHz band, a 2.0 GHz band, a 2.3 GHz band, a 2.4 GHz band, a 2.5 GHz band, and a 5 GHz band; and said conversion of the plurality of input streams respectively into the plurality of signals is performed respectively by a plurality of base converter mixers in the base converter operating as down-converters.

13. The method of claim 11, wherein:
the plurality of input streams are input to the base converter in a base-band form; and said conversion of the plurality of input streams respectively into the plurality of signals is performed respectively by a plurality of base converter mixers in the base converter operating as up-converters.

14. The method of claim 11, wherein:
the plurality of streams are input to the base converter in a digital form; and
said conversion of the plurality of input streams respectively into the plurality of signals comprises a modulation process, including but not limited to an orthogonal frequency-division multiplexing (OFDM) modulation process.

15. The method of claim 1, further comprising:
generating, by an access point, the plurality of input streams, out of the N data streams, wherein:
the access point is at least one of (a) a Wi-Fi access point supporting at least partly a standard associated with IEEE 802.11, including but not limited to IEEE 802.11n or IEEE 802.11ac or (b) a Long-Term Evolution (LTE) access point supporting at least partly a standard associated with LTE, and the spatial multiplexing in conjunction with plurality of input streams is part of at least one of the standard associated with IEEE 802.11 or the standard associated with LTE.

16. The method of claim 15, wherein the plurality of output signals all occupying the single wireless frequency range are associated with the at least one of the standard associated with IEEE 802.11 or the standard associated with LTE.

17. The method of claim 16, wherein (i) the single wireless frequency range is a single channel associated with the at least one of the standard associated with IEEE 802.11 or the standard associated with LTE and (ii) the plurality of output signals are orthogonal frequency-division multiplexing (OFDM) signals.

18. The method of claim 17, wherein the single channel is associated with an unlicensed industrial, scientific and medical (ISM) band selected from a group of unlicensed bands consisting of (i) the 2.4 GHz band and (ii) the 5 GHz band.

* * * * *